US006377415B2

(12) United States Patent
Akutsu et al.

(10) Patent No.: US 6,377,415 B2
(45) **Date of Patent: *Apr. 23, 2002**

(54) STORAGE DEVICE HAVING HEAD IC CONFIRMATION PROCESSING

(75) Inventors: Kazuyoshi Akutsu; Hiroyuki Tanaka, both of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,906

(22) Filed: May 21, 1999

(30) Foreign Application Priority Data

Nov. 2, 1998 (JP) .......................................... 10-312509

(51) Int. Cl.[7] .......................... G11B 15/12; G11B 5/09; G11B 5/02

(52) U.S. Cl. .............................. 360/61; 360/46; 360/25

(58) Field of Search ............................. 360/61, 67, 46, 360/25, 31

*Primary Examiner*—Regina Y. Neal
(74) *Attorney, Agent, or Firm*—Greer, Burns & Crain, Ltd.

(57) ABSTRACT

The storage device according to the present invention comprises head ICs 117$_1$ and 117$_2$ provided in correspondence to a plurality of magnetic disks 111$_1$ and 111$_n$. When selected, the head IC 117$_1$ outputs a first IC current I1 and the head IC 117$_2$ outputs a second IC current I2. A current/voltage converting circuit 132 converts a synthesized current I0 obtained by synthesizing the first IC current I1 and second IC current I2 to a corresponding IC voltage Vic. A voltage comparing circuit 134 compares a reference voltage Vr to an IC voltage Vic and outputting a result of comparison as a comparison result voltage Vc. A HDC circuit 121C outputs a select command Cs for selecting all IC heads, when a power is turned ON, to the control circuit 125C. The HDC circuit 21C also confirms according to the comparison result voltage Vc whether the number of head ICs is one or two.

8 Claims, 13 Drawing Sheets

STORAGE DEVICE HAVING HEAD IC CONFIRMATION PROCESSING

BACKGROUND OF THE INVENTION

The present invention relates to a storage device used as an external storage device for a computer or the like as well as to a control unit and a control method for the same.

FIELD OF THE INVENTION

As an external storage device for a computer or the like, there has been used a storage device having a magnetic disk as a storage medium. A memory capacity of a storage device is increasing in association with the increase in the performance of a main system of a computer and increase in a program size of software used in computers. Accordingly, also a recording density has been becoming substantially higher, and at the same time there is the strong need for size reduction.

FIG. 8 is a block diagram showing electrical configuration of a storage device 100 based on the conventional technology. In this figure, the storage device 100 comprises a HDA (head disk assembly) 110 having a shielding vessel consisting of a base and a cover for shielding the magnetic disks $\mathbf{111}_1$ to $\mathbf{111}_n$ and magnetic heads $\mathbf{113}_1$ to $\mathbf{113}_n$ packaged therein, a printed circuit board 120 with various types of circuits such as a HDC (hard disk controller) circuit 121A or a control circuit 125A printed thereon, and a connector 140 for electrically connecting the components of the HDA 110 to the printed circuit board 120. The storage device 100 is also connected to a CPU 150 provided in a main system of a computer not shown in the figure, and executes data write/read according to an instruction from the CPU 150.

In the HDA 110, magnetic disks $\mathbf{111}_1$ to $\mathbf{111}_n$ are n sheets of storage medium each magnetically storing data therein, and are respectively provided in a layered form along the axis of rotation. An SPM (spindle motor) 112 rotates the magnetic disks $\mathbf{111}_1$ to $\mathbf{111}_n$ at a high speed. Each of magnetic head $\mathbf{113}_1$ to $\mathbf{113}_n$ comprises a cut ring shaped head core having an extremely narrow gap between the two ends and a coil wound around the head core, and the magnetic head $\mathbf{113}_1$ to $\mathbf{113}_n$ are provided adjacent to the magnetic disks $\mathbf{111}_1$ to $\mathbf{111}_n$ respectively.

The magnetic heads $\mathbf{113}_1$ to $\mathbf{113}_n$ write a data into the magnetic disk $\mathbf{111}_1$ to $\mathbf{111}_n$ according to a magnetic field generated by a recording current supplied to the coil when data is written therein, and they also detect the data stored in the magnetic disks $\mathbf{111}_1$ to $\mathbf{111}_n$ as a regenerated voltage. The number of these magnetic heads are appropriately selected according to the number of the magnetic disks.

A carriage 114 is provided adjacent to the magnetic disks $\mathbf{111}_1$ to $\mathbf{111}_n$, and supports the magnetic heads $\mathbf{113}_1$ to $\mathbf{113}_n$. A VCM (voice coil motor) 115 moves the magnetic heads $\mathbf{113}_1$ to $\mathbf{113}_n$ by rotating the carriage. An FPC (flexible print circuit sheet) 116 is a flexible wiring material having a form like a sheet and is used for connection between the carriage 114 and each terminal (not shown herein) of the connector 140.

Head IC (integrated circuit) $\mathbf{117}_1$ and head IC $\mathbf{117}_2$ each comprise a write amplifier and a preamplifier (both not shown herein), and are packaged on a surface of an FPC 116 in parallel to each other. The write amplifier switches the polarity of the recording current to be supplied to each of the magnetic heads $\mathbf{113}_1$ to $\mathbf{113}_n$ according to write data supplied from the CPU 150, and the preamplifier amplifiers a regenerated voltage (read voltage) detected by each of the magnetic head $\mathbf{113}_1$ to $\mathbf{113}_n$.

Herein, a number of magnetic heads which can be controlled by one head IC (for instance, head IC $\mathbf{117}_1$) is naturally limited, and when the number n of the magnetic heads $\mathbf{113}_1$ to $\mathbf{113}_n$ exceeds the upper limit, two head ICs (in a case shown in the figure, the head ICs $\mathbf{117}_1$ and $\mathbf{117}_2$) are provided, and the magnetic heads $\mathbf{113}_1$ to $\mathbf{113}_n$ are controlled by these two heads.

Thus, the head IC $\mathbf{117}_1$ shown in this figure is provided for a specified number of magnetic heads of the magnetic heads $\mathbf{113}_1$ to $\mathbf{113}_n$, and the head IC $\mathbf{117}_2$ is provided for the remaining ones of the magnetic heads $\mathbf{113}_1$ to $\mathbf{113}_n$.

When the number of magnetic heads $\mathbf{113}_1$ to $\mathbf{113}_n$ does not exceeds the upper limit, the head IC $\mathbf{117}_2$ need not be provided, and the magnetic heads $\mathbf{113}_1$ to $\mathbf{113}_n$ may be controlled by only the head IC $\mathbf{117}_1$.

Further the head IC $\mathbf{117}_1$ and head IC $\mathbf{117}_2$ output a first IC current I1 and a second IC current I2 from each terminal not shown herein when a select signal Ss described later is inputted and selected. The first IC current I1 and second IC current I2 are outputted via the FPC 116 to the connector 140.

The printed circuit board 120 is a board detachably attached via the connector 140 to a rear surface of the HDA 110, and the connector 140 plays as an interface between components of the HDA 110 and various circuits packaged on the printed circuit board 120. In the printed circuit board 120 described above, the HDC circuit 121A is connected via a SCSI (Small Computer System Interface) bus not shown herein to the CPU 150, and transacts various types of instruction, write data to be written in the magnetic disks $\mathbf{111}_1$ to $\mathbf{111}_n$ and read data read out from the magnetic disks $\mathbf{111}_1$ to $\mathbf{111}_n$ to the CPU 150 via the SCSI bus.

The HDC circuit 121A generates a select command Cs for selecting one of the head ICs $\mathbf{117}_1$ and $\mathbf{117}_2$, a control signal for controlling a format of recording and regeneration in the magnetic disks $\mathbf{111}_1$ to $\mathbf{111}_n$ or the like. Detailed description of operations of the HDC circuit 121A is made later.

A buffer circuit 122 is a DRAM (Dynamic Random Access Memory) having a storage capacity of 512 K bytes, and temporally stores therein write data inputted from the CPU 150 and read data read out from the magnetic disks $\mathbf{111}_1$ to $\mathbf{111}_n$.

A ROM (Read Only Memory) 123 stores a program for write/read control executed by the HDC circuit 121A, and is accessed by the HDC circuit 121A when the program is to be executed. A RAM (Random Access Memory) 124 temporarily stores the data generated when the above program is executed.

A read/write circuit 129 has circuits such as a modulating circuit for writing write data in the magnetic disks $\mathbf{111}_1$ to $\mathbf{111}_n$, a parallel/serial converting circuit for converting parallel write data to serial data, a demodulating circuit for reading read data from the magnetic disks $\mathbf{111}_1$ to $\mathbf{111}_n$ or the like.

Further, the read/write circuit 129 has circuits such as a serial/parallel converting circuit for converting serial read data to parallel data, a synthesizer circuit for generated a timing signal for controlling timing for each section of the device by multiplying a frequency of an oscillation circuit using a quartz oscillator or the like. When a select command Cs is inputted from the HDC circuit 121A, the control circuit 125A outputs a select signal Ss to any of the head IC $\mathbf{117}_1$ and head IC $\mathbf{117}_2$ via the connector 140 and FPC 116. Detailed description of operations of the control circuit 125A is made later.

A servo demodulating circuit 126 demodulates servo patterns for positioning stored in the magnetic disks $\mathbf{111}_1$ to $111_n$ by means of peak holding or integration. A VCM (Voice Coil Motor) driving circuit 127 drives the VCM 115, and has a power amplifier (not shown) for supplying a driving current to the VCM 115. A SPM (spindle motor) driving circuit 128 drives the SPM 112, and has a power amplifier (not shown) for supplying a driving circuit via the connector 140.

The control circuit 125A recognizes a servo pattern demodulated by the servo demodulating circuit 126, and controls a driving current supplied to the VCM driving circuit 127 and the SPM driving circuit 128 for providing positional controls over the magnetic heads $113_1$ to $113_n$. The control circuit 125A also controls the HDC circuit 121A, read/write circuit 129, buffer circuit 122.

A pull-up circuit 131 is packaged on the printed circuit board 120 and is electrically connected via the connector 140 to the FPC 116. Herein when two head ICs $117_1$ and $117_2$ are electrically packaged in the FPC 116, the pull-up circuit 131 is connected to the ground in the side of FPC 116. In this case, the pull-up circuit 131 outputs a pull-up voltage Vp (low-level voltage) when a power is supplied. Namely, when a pull-up voltage Vp from the pull-up circuit 131 is 0 V, it indicates that a number Nic of head ICs electrically connected to the FPC 116 (of head IC $117_1$ and head IC $117_2$ in the figure) is two.

On the other hand, when it is determined that only one head IC $117_1$ is electrically connected to the FPC 116, it indicates that the pull-up circuit is not connected to ground. In this case, the pull-up circuit 131 outputs a pull-up voltage Vp of 5 V (high-level voltage). Namely, when a pull-up voltage Vp from the pull-up circuit 131 is 5 V, it indicates that the number Nic of head ICs (head IC $117_1$ in the figure) electrically connected to the FPC 116 is one.

The current/voltage converting circuit 132 converts a synthesized current I0 (=first IC current I1+second IC current I2) inputted via the connector 140 to a IC voltage Vic. Herein, when two head ICs $117_1$ and $117_2$ are selected, as the first IC current I1 and second IC current I2 are outputted from the terminals respectively, so that the synthesized current I0 is a sum of the first IC current I1 and second IC current 12.

On the other hand, when only one head IC $117_1$ is selected, the first IC current I1 is outputted from a terminal of the head IC $117_1$, and the second IC current I2 is not outputted from the head IC $117_2$, so that the synthesized current I0 is equal to the first IC current I1.

As an example of the IC voltage Vic, when the number Nic of head ICs is two, namely when the synthesized current I0=(first IC current I1)+(second IC current I2), the IC voltage Vic is 1.0 V. On the other hand, when the number Nic of head ICs is one, namely when the synthesized current I0=first IC current I1, the IC voltage Vic is 3.0 V.

A reference voltage generating circuit 133A generates a reference voltage Vr (=1.7 V) used for comparison with the IC voltage Vic in a voltage comparing circuit 134. The voltage comparing circuit 134 compares the IC voltage Vic inputted from the current/voltage converting circuit 132 to the reference voltage Vr. When the IC voltage Vic is higher than the reference voltage Vr the voltage comparing circuit 134 outputs a comparison result voltage Vc of 5 V indicating a result of comparison to the control circuit 125A. The fact that the comparison result voltage Vc is 5 V indicates that only one head IC (for instance, head IC $117_1$) has been selected.

On the other hand, the voltage comparing circuit 134 outputs a comparison result voltage Vc of 0 V indicating a result of comparison to the control circuit 125A when the IC voltage Vic is lower than the reference voltage Vr. Herein, the fact that the comparison result voltage Vc is 0 V indicates that two head ICs (head ICs $117_1$ and $117_2$) are selected.

Operations of the storage device 100 based on the conventional technology will be described with reference to FIG. FIG. 9 and FIG. 10. FIG. 9 is a flow chart showing operations of the storage device 100 based on the conventional technology for recognizing (confirming) the number of ICs, while FIG. 10 is a flow chart showing a read/write processing in the storage device 100 based on the conventional technology.

Herein the operation for checking the number of ICs in FIG. 9 means an operation for making the HDC circuit 121A recognize the number Nic of head ICs electrically connected to the FPC 116 as an initial operation after a power is supplied to each section of the storage device 100. Herein, the reason for making the HDC circuit 121A recognize the number Nic of head ICs is that a method for the read/write processing changes according to the number Nic of head ICs.

On the other hand, the read/write control processing in FIG. 10 indicates a write operation for writing write data supplied from the CPU 150 in the magnetic disks $111_1$ to $111_n$ and a read operation for reading read data from the magnetic disks $111_1$ to $111_n$.

In FIG. 8, it is assumed that two head ICs $117_1$ and $117_2$ are electrically connected to the FPC 116 and also that the pull-up 131 is grounded in the FPC 116 side. In this case, when a power is supplied to each section of the device, the HDC circuit 121A shifts the processing to step SA1 shown in FIG. 9, determines as to whether a pull-up voltage Vp has been inputted from the pull-up circuit 131 to the control circuit 125A or not. When it is determined that the pull-up voltage Vp has not been inputted from the pull-up circuit 131 to the control circuit 125A the same operation is repeated.

When a power is supplied to the pull-up circuit 131, as the pull-up circuit 131 is connected to ground it outputs a pull-up voltage Vp of 0 V (low-level voltage) to the control circuit 125A. The HDC circuit 121A determines that the result of determination in step SA1 as "Yes" and shifts the processing to step SA2. In step SA2, the HDC circuit 121A determines whether the pull-up voltage Vp inputted into the control circuit 125A is 5 V(high-level voltage) or not. In this case, the HDC circuit 121A recognizes the result of determination as "No" and then shifts the processing to step SA5. In step SA5, the HDC circuit 121A recognizes according to the pull-up voltage Vp (=0 V) that the number Nic of ICs is two, shifts the processing to step SA4 and then executes the read/write control processing.

On the other hand, when only one head IC $117_1$ is connected and at the same time the pull-up circuit 131 is not connected to the ground, as a pull-up voltage Vp outputted from the pull-up circuit 131 to the control circuit 125A is 5 V (high-level voltage) the HDC circuit 121A recognizes that a result of comparison in step SA2 is "Yes" and shifts the processing to step SA3. In step SA3, the HDC circuit 121A recognizes according to the pull-up voltage Vp (=5 V) that the number Nic of ICs is one, shifts the processing to step SA4 and then executes the read/write control processing.

Description is made for the read/write control processing when the number Nic of ICs is two, namely when the HDC circuit 121A shifts the processing from step SA5 to step SA4 in FIG. 9 with reference to FIG. 10.

Assuming that a command for writing write data in the magnetic disks $111_1$ to $111_n$, or a command for reading read data from the magnetic disks $111_1$ to $111_n$ is inputted from the CPU 150 shown in FIG. 8 to the HDC circuit 121A, the HDC 121A shifts the processing to step SB1 shown in FIG. 10. In step SB1, the HDC circuit 121A selects a head IC to be used for read/write from or to the magnetic disks $111_1$ to $111_n$ out of the two head ICs $117_1$ and $117_2$ recognized in step SA5 (Refer to FIG. 9). In this case, if the head IC $117_1$ is selected, the HDC circuit 121A outputs a select command Cs indicating a result of the selection above to the control circuit 125A.

In step SB2, the control circuit 125A outputs a select signal Ss via the connector 140 and FPC 116 to the head IC $117_1$. In step SB3, the current/voltage converting circuit 132 determines whether the synthesized current I0 is inputted or not and waits till the synthesized current I0 is inputted.

When the select signal Ss is inputted into the head IC $117_1$, the first IC current I1 is outputted as the synthesized current I0 from a terminal of the head IC $117_1$ via the FPC 116 and connector 140 to the current/voltage converting circuit 132. The current/voltage converting circuit 132 shifts the processing from step SB3 to step SB4, converts the inputted synthesized current I0 to the IC voltage Vic (=3.0 V), and then outputs the IC voltage Vic to the voltage comparing circuit 134.

In step SB5, the voltage comparing circuit 134 compares the inputted IC voltage Vic (=3.0 V) with the reference voltage Vr (1.7 V) inputted from the reference voltage generating circuit 133A and then shifts the processing to step SB6. In step SB6, the voltage comparing circuit 134 determines whether the IC voltage Vic is higher than the reference voltage Vr or not, and as the IC voltage Vic is higher than the reference voltage Vr in this case, recognizes that a result of determination in step SB6 is "Yes" and then shifts the processing to step SB7.

In step SB7, the voltage comparing circuit 134 outputs the comparison result voltage of 5 V (high-level voltage) indicating a result of comparison to the control circuit 125A. With this operation, in step SB8, the HDC circuit 121A recognizes that a head IC has been selected normally, and shifts the processing to step SB9. Herein normal selection indicates that the select signal Ss is inputted only to the head IC $117_1$ selected in step SB1, and that the selected head IC $117_1$ is operating normally. In step SB9, the HDC circuit 121A executes read/write controls over the magnetic disks $111_1$ to $111_n$ by controlling each section of the device according to a command from the CPU 150.

On the other hand, in step SB2, it is assumed that the select signal Ss was outputted to both the head ICs $117_1$ and $117_2$ due to a trouble or for some other reasons in spite that it was instructed to output the select signal Ss via the connector 140 and FPC 116 from the control circuit 125A only to the head IC $117_1$. Namely, in this case, in spite that the HDC circuit 121A selected one head IC $117_1$, two head ICs $117_1$ and $117_2$ were selected due to a trouble or for some other reasons.

Then, when the select signal Ss is inputted into both the head ICs $117_1$ and $117_2$, a sum of the first IC current I1 and second IC current I2 is outputted as the synthesized current I0 from terminal of the head ICs $117_1$ and $117_2$ via the FPC 116 and connector 140 to the current/voltage converting circuit 132. Therefore, the current/voltage converting circuit 132 shifts the processing from step SB3 to step SB4, converts the inputted synthesized current I0 to the IC voltage Vic (=1.0 V), and outputs the IC voltage Vic to the voltage comparing circuit 134. In step SB5, the voltage comparing circuit 134 compares the inputted IC voltage Vic (=1.0 V) with the reference voltage Vr (1.7 V) inputted from the reference voltage generating circuit 133A, and then shifts the processing to step SB6. In step SB6, as the IC voltage Vic is lower than the reference voltage Vr, the voltage comparing circuit 134 recognizes a result of determination in step SB6 as "No", and shifts the processing to step SB10.

In step SB10, the voltage comparing circuit 134 outputs a comparison result voltage Vc of 0 V indicating a result of comparison to the control circuit 125A. In step SB10, the HDC circuit 121A recognizes that two head IC have been selected, namely that an abnormal state (trouble) has been generated, shifts the processing to step SB12 and terminates the read/write control processing.

In the above description, it is assumed that the number Nic of head ICs electrically connected to the FPC 116 in the storage device 100 is two, but hereafter description is made for an another storage device in which the number Nic is three with reference to FIG. 11.

FIG. 11 is a block diagram showing electrical configuration of a storage device 200 having the conventional type of configuration. In this figure, the same reference numerals are assigned to the same components as those in FIG. 8 and description thereof is omitted herein. In FIG. 11, a HDC circuit 121B and a control circuit 125B are provided in place of the HDC circuit 121A and control circuit 125A shown in FIG. 8, and a head IC $117_3$ and a pull-down circuit 135 are added. In FIG. 11, a read/write circuit 129 also provides read/write controls over the third head IC $117_3$.

The head IC $117_3$ shown in FIG. 11 has the same functions as those of the head ICs $117_1$ and $117_2$, and is provided in parallel with the head ICs $117_1$ and $117_2$ on a surface of the FPC 116. The basic functions of the HDC circuit 121B are the same as those of the HDC circuit 121A, however it outputs a select command Cs for selecting one of the three head ICs $117_1$ to $117_3$ to the control circuit 125B, and provides read/write controls using these three head ICs $117_1$ to $117_3$. It should be noted that detailed description is made later for operations of the HDC circuit 121B and control circuit 125B.

The pull-down circuit 135 is packaged on the printed circuit board 120, and is electrically connected via the connector 140 to the FPC 116. Also the pull-down circuit 135 is grounded in the side of FPC 116. In this state of connection, when a power is supplied, the pull-down circuit 135 outputs a pull-down voltage Vd of 0 V (low-level voltage) to the control circuit 125B.

On the other hand, the pull-up circuit 131 packaged in parallel with the pull-down circuit 135 is not connected to the ground in the FPC 116 side. Therefore, when a power is supplied, the pull-up circuit 131 outputs a pull-up voltage Vp of 5 V (high-level voltage) to the control circuit 125B. Namely, when a pull-down voltage Vd from the pull-down circuit 135 is 0 V (low-level voltage) and at the same time a pull-up voltage Vp from the pull-up circuit 131 is 5 V (high-level voltage), it indicated that the number Nic of head ICs electrically connected to the FPC 116 (head ICs $117_1$ to $117_2$ in the figure) is three.

Description is made for operations of the conventional type of storage device 200 for checking the number of ICs with reference to FIG. 12. Herein the operation for recognizing the number of ICs means an operation for making the HDC circuit 121B recognize the number Nic of head ICs electrically connected to the FPC 116 as an initial operation after a power is supplied to each section of the storage device 200.

In FIG. 11, when a power is supplied to each section of the device, the HDC circuit 121B shifts the processing to step SC1 shown in FIG. 12 with a pull-up voltage Vp (=5 V) inputted from the pull-up circuit 131 to the control circuit 125B, and determines whether a pull-up voltage (=0 V) has been inputted from the pull-up circuit 135 or not, and, when a result of determination is "No", repeats the determination.

When a power is supplied to each of the pull-up circuit 131 and pull-down circuit 135, the pull-up circuit 131 outputs a pull-up voltage Vp (=5 V) to the control circuit 125B, and the pull-down circuit 135 outputs a pull-down voltage Vd (=0 V) to the control circuit 125B. The HDC circuit 121B recognizes that a result of determination in step SC1 is "Yes" and shifts the processing to step SC2. In step SC2, the HDC circuit 121B recognizes that the number Nic of ICs is three, shifts the processing to step SC3, provides the read/write controls as shown in FIG. 10, and executes the read/write control processing using the three head ICs $\mathbf{117}_1$ to $\mathbf{117}_3$.

In the conventional types of storage devices as described above, there are strong needs for simplifying the configuration, reducing the size and the cost by reducing an area required for packaging or required components in association with the tendency for higher performance and size reduction of computers. At the same time, there are also the needs for larger storage capacity and higher recording density, which necessitates packaging of components each with complicated circuit configuration on a printed circuit board having a limited packaging area.

In the conventional type of storage device 100 as shown in FIG. 8, as the pull-up circuit 131 used only for recognizing the number of ICs is packaged on the printed circuit board 120, an additional area for packaging must be acquired on the printed circuit board 120, and this need has not fully been satisfied in the conventional technology.

Especially, when the number Nic of head ICs is three like in a case of the storage device 200 shown in FIG. 11, in addition to the pull-up circuit 131, also the pull-down circuit 135 is required to additionally be packaged on the printed circuit board 120, which makes it difficult to achieve the above-described objects of simplification, size reduction, and cost reduction.

SUMMARY OF THE INVENTION

It is an object of the present invention to provide a storage device which allows simplification of configuration, size reduction, and cost reduction as well as a control unit and a control method for the same.

With the present invention, all of the head ICs are selected by a selecting unit, and if the number of head ICs is one, an IC current is inputted as a synthesized current from this head IC to an IC number checking unit. From the inputted synthesized current the IC number checking unit recognizes that the number of head ICs is one. On the other hand, when the number of head ICs is plural and all of the head ICs are selected by the selecting unit, IC currents are outputted from each of the head IC, and the IC currents are summed up into a synthesized current that is inputted into the IC number checking unit. From the inputted synthesized current the IC number checking unit recognizes that the number of head ICs is plural.

According to the present invention, the number of head ICs is confirmed according to the synthesized current obtained by synthesizing the IC currents, so that a circuit dedicated for confirming the number of ICs as required in the conventional technology is not necessary, and a packaging area equivalent to the packaging area of such a dedicated circuit can be reduced.

With the present invention, when all of the head ICs are selected by a selecting unit, IC currents from each of the head ICs are summed up to get a synthesized current that is inputted into a current/voltage converting unit. The current/voltage converting unit converts the synthesized current to an IC voltage, and a comparing unit compares the IC voltage to a reference voltage. An IC number confirming unit confirms from a result of comparison by the comparing unit whether the number of head ICs is one or plural.

According to the present invention, whether the number of head ICs is one or plural is confirmed according to a result of comparison by the comparing unit, so that a circuit dedicated for confirming the number of ICs as required in the conventional technology is not necessary, and a packaging area equivalent to the packaging area of such a dedicated circuit can be reduced.

With the present invention, all of the head ICs are selected by a selecting unit, and when the number of head ICs is one, an IC current from this head IC is inputted as a synthesized current into an IC number confirming unit. From the inputted synthesized current the number checking unit recognizes that the number of head ICs is one. On the other hand, when there are a plurality of head ICs and all of the head ICs are selected by the selecting unit, IC currents are outputted from each of the head ICs and the IC currents are summed up to get a synthesized current that is inputted into the IC number checking unit. From the inputted synthesized current the IC number confirming unit recognizes that the number of head ICs is plural.

According to the present invention, the number of head ICs is confirmed according to a synthesized current obtained by synthesizing IC currents, so that a circuit dedicated for confirming the number of ICs as required in the conventional technology is not necessary, and a packaging area equivalent to the packaging area of such a dedicated circuit can be reduced.

With the present invention, when all of the head ICs are selected by a selecting unit, IC currents are outputted from each of the head ICs and are summed up to get a synthesized current that is inputted into a current/voltage converting circuit. The current/voltage converting unit converts the synthesized current to an IC voltage, and a comparing unit compares the IC voltage with a reference voltage. An IC number confirming unit confirms according to a result of comparison by the comparing unit whether the number of head ICs is one or plural.

According to the present invention, whether the number of head ICs is one or plural is checked according to a result of comparison by the comparing unit, so that a circuit dedicated for confirming the number of ICs as required in the conventional technology is not necessary, and a packaging area equivalent to the packaging area of such a dedicated circuit can be reduced.

With the present invention, all of the head ICs are selected in a selecting step, and when the number of head ICs is one, an IC current is outputted as a synthesized current from this head IC. In an IC number confirming step it is recognized according to the synthesized current that the number of head ICs is one. On the other hand, when there are a plurality of head ICs all of the head ICs are selected in the selecting step and the IC currents outputted from each of the head ICs are summed and outputted as a synthesized current. Thus, in the IC number confirming step it is recognized according to the synthesized current that the number of head ICs is plural.

According to the present invention, the number of head ICs is confirmed according to the synthesized current obtained by synthesizing the IC currents, so that a circuit dedicated for confirming the number of ICs as required in the conventional technology is not necessary, and a packaging area equivalent to the packaging area of such a dedicated circuit can be reduced.

With the present invention, head ICs are selected in a selecting step, and IC currents are outputted as a synthesized current from the head ICs. The synthesized current is converted to an IC voltage in a current/voltage converting step, and the IC voltage is compared with a reference voltage in a comparing step. In an IC number confirming step, whether the number of head ICs is one or plural is confirmed according to a result of comparison in the comparing step.

According to the present invention, whether the number of head ICs is one or plural is confirmed according to a result of comparison in the comparing step, so that a circuit dedicated for confirming the number of ICs as required in the conventional technology is not necessary, and a packaging area equivalent to the packaging area of such a dedicated circuit can be reduced.

Other objects and features of this invention will become apparent from the following description with reference to the accompanying drawings.

DESCRIPTION OF THE PREFERRED EMBODIMENTS

Embodiments 1 to 3 of the storage device according to the present invention are described below with reference to the related drawings.

Figure 1:
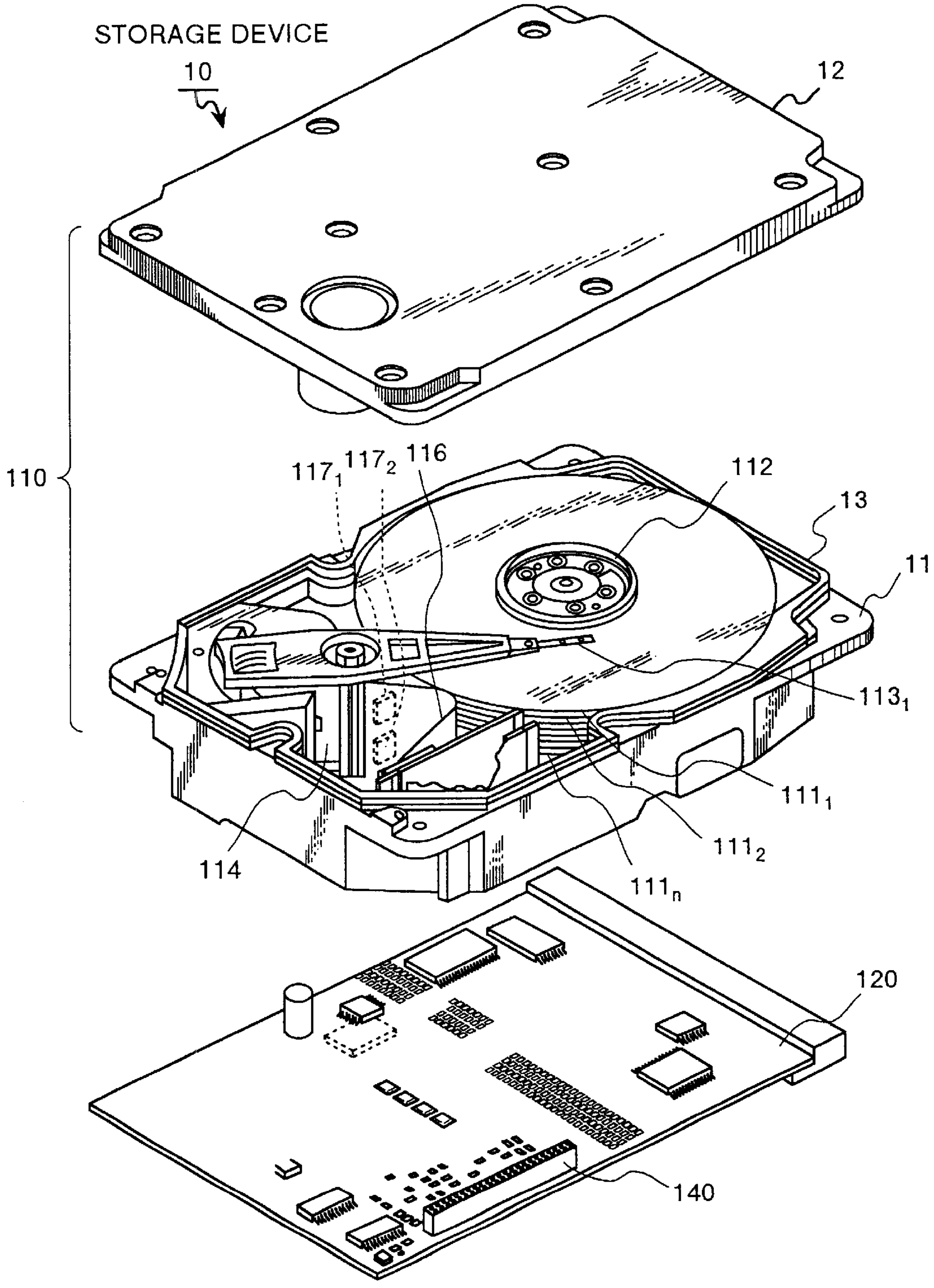
FIG. 1 is an exploded perspective view showing an outer appearance and the configuration of a storage device according to Embodiment 1 of the present invention.
Figure 2:
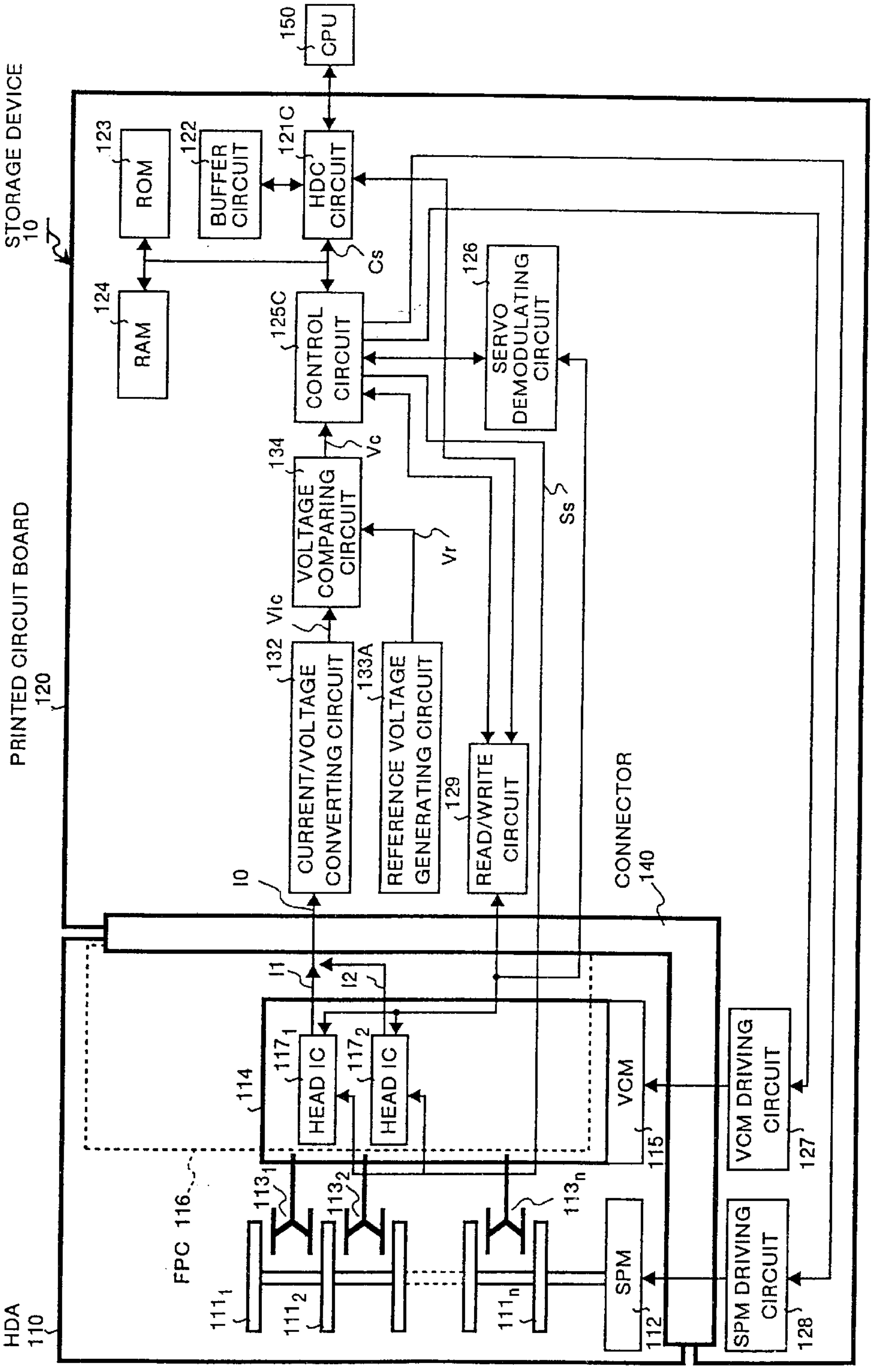
FIG. 2 is a block diagram showing an electrical configuration of the storage device according to Embodiment 1.

FIG. 1 is an exploded perspective view showing the outer appearance and the configuration of a storage device 10 according to Embodiment 1 of the present invention, and FIG. 2 is a block diagram showing electrical configuration of the storage device 10 according to Embodiment 1. The same reference numerals are assigned in FIG. 1 and FIG. 2 to the same components as those in FIG. 8, and description thereof is omitted therein.

Figure 8:
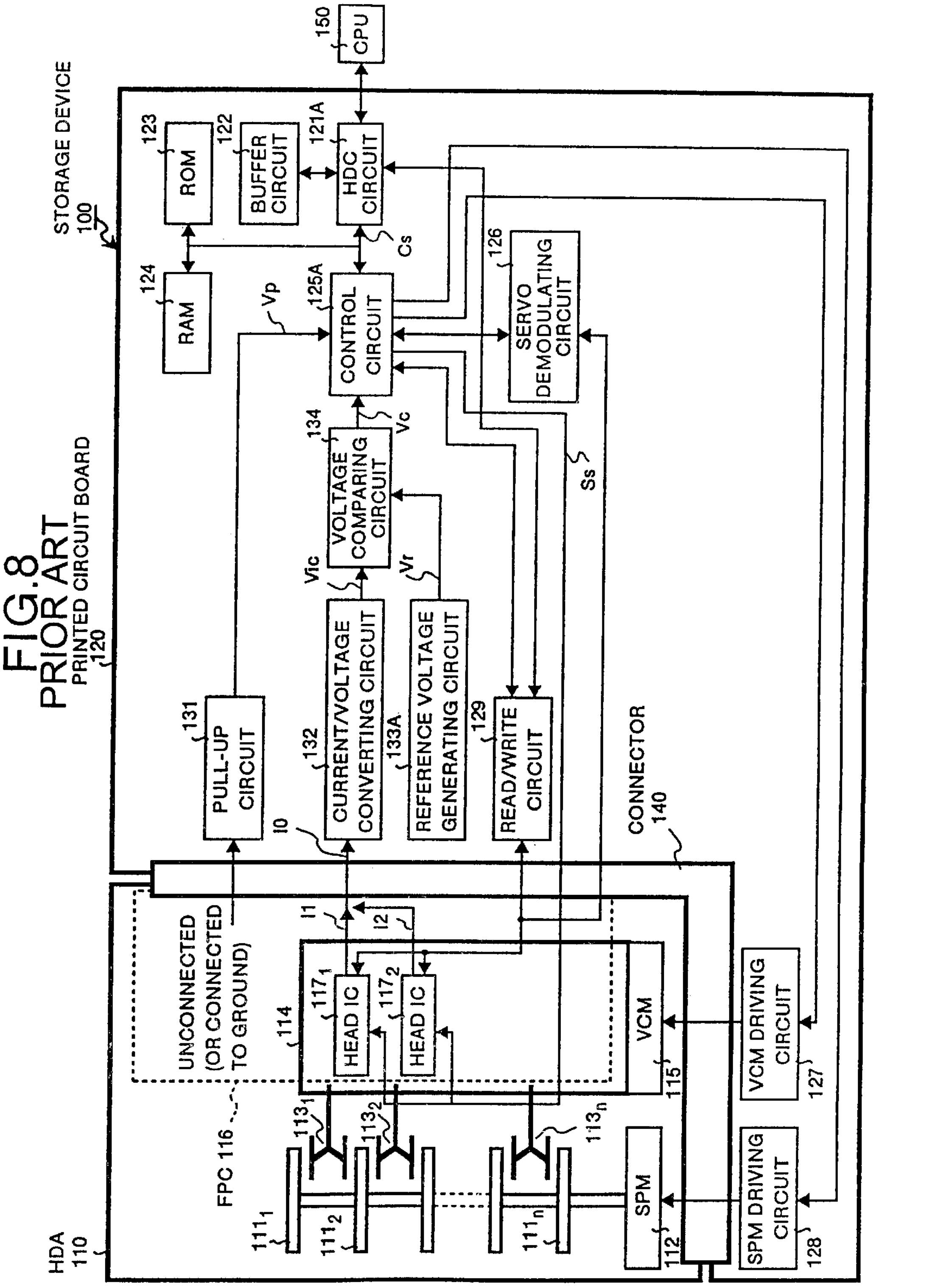
FIG. 8 is a block diagram showing electrical configuration of a storage device based on the conventional technology.
Figure 9:
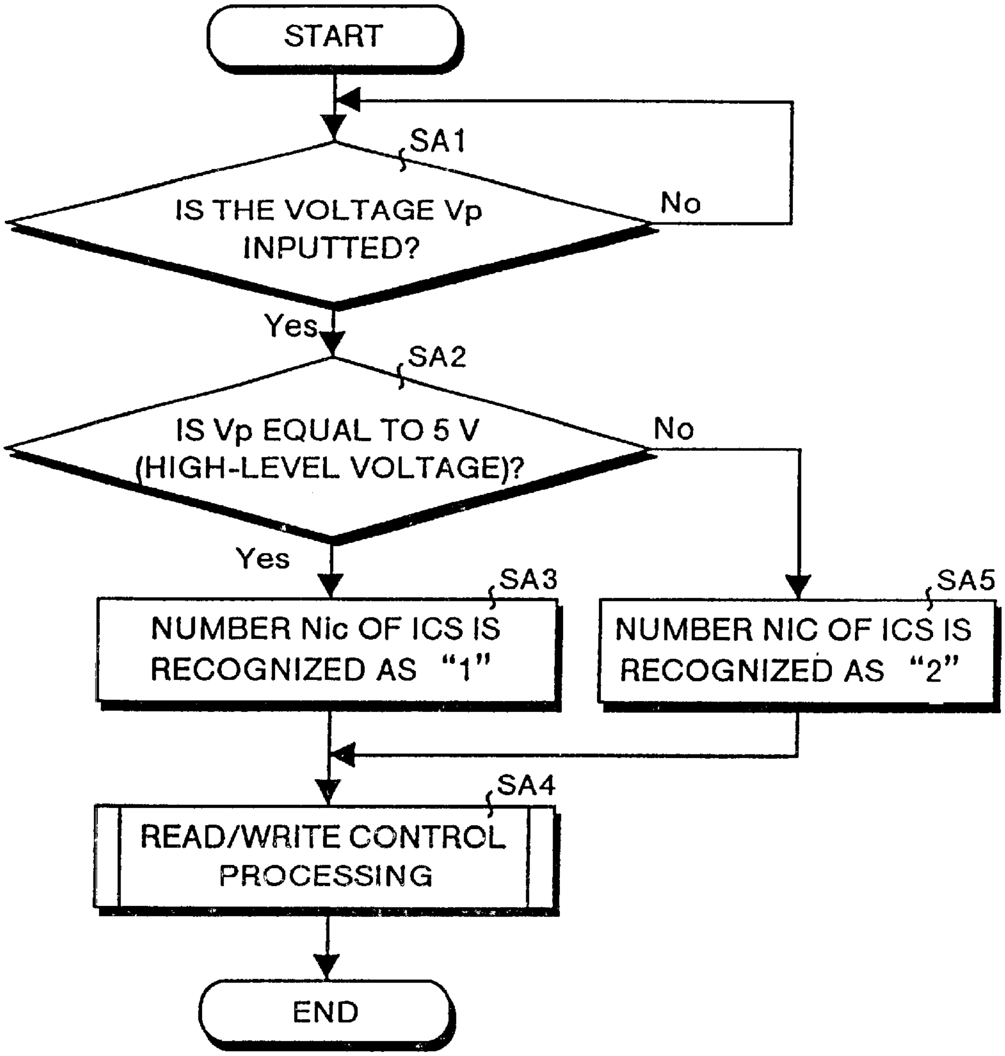
FIG. 9 is a flow chart showing operations for recognizing the number of head ICs in the above storage device based on the conventional technology.

In the storage device shown in FIG. 2, a HDC circuit 121C and a control circuit 125C are provided in place of the HDC circuit 121A and control circuit 125A shown in FIG. 8, and the pull-up circuit 131 shown in FIG. 8 is not provided.

Figure 10:
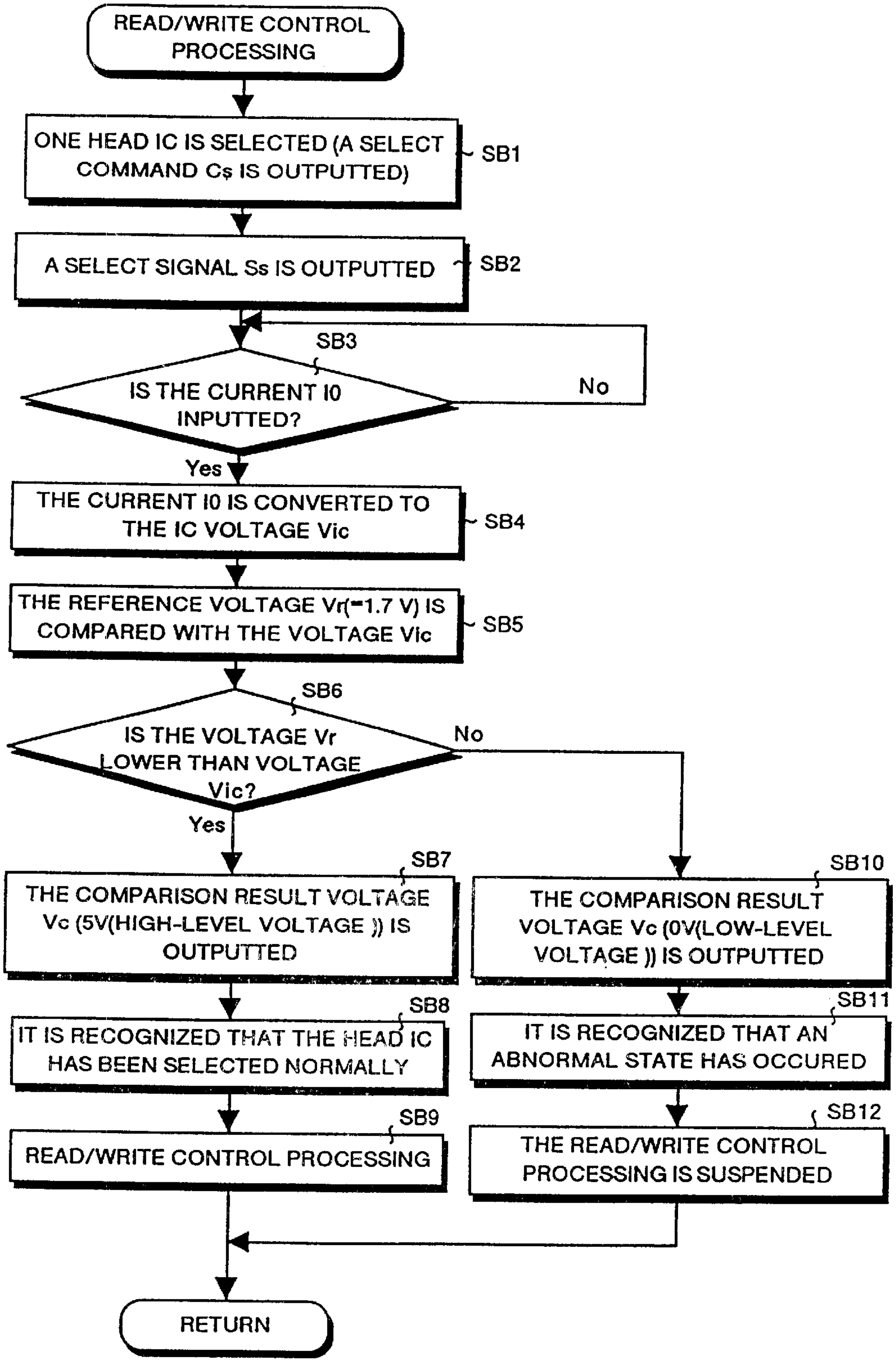
FIG. 10 is a flow chart showing read/write control processing in the above storage device based on the conventional technology.

The HDC circuit 121C and control circuit 125C shown in FIG. 2 has the same functions for the read/write control processing described with reference to FIG. 10 as those of the HDC circuit 121A and control circuit 125A shown in FIG. 8, but the operation for recognizing the number of head ICs is different from those in the HDC circuit 121A and the control circuit 125A. Details of the operation for recognizing the number of ICs in the HDC circuit 121C and control circuit 125C are described later, and briefly the HDC circuit 121C and control circuit 125C recognize the number of ICs by checking whether the number Nic of ICs is one or two making use of the existing current/voltage converting circuit 132, voltage comparing circuit 134, and reference voltage generating circuit 133A.

FIG. 1 shows the appearance and configuration of the storage device 10 (Refer to FIG. 2) according to Embodiment 1. In the storage device 10 shown in FIG. 1, a HDA 110 (Refer to FIG. 2) is attached to a rear surface of the printed circuit board 120 (Refer to FIG. 2).

The HDA 110 comprises a base 11 which has a shape like a box with the top face open, the magnetic disks $\mathbf{111}_1$ to $\mathbf{111}_n$, a SPM 112, magnetic heads $\mathbf{113}_1$ to $\mathbf{113}_n$, a carriage 114, a VCM 115, an FPC 116, head ICs $\mathbf{117}_1$ and $\mathbf{117}_2$, a cover 12 for shielding the upper opening of the base 11, and a packing 13. It should be noted that, of the components accommodated in the base 11, magnetic heads $\mathbf{113}_2$ to $\mathbf{113}_n$, and VCM 115 are not shown.

Various types of circuits such as the HDC circuit 121C or the buffer circuit 122 shown in FIG. 2 are packaged on the printed circuit board 120 shown in FIG. 1, and these various types of circuits are electrically connected via the connector 140 to various types of components (head IC $\mathbf{117}_1$ or the like) in the HDA 110.

Description is made for the operations for recognizing the number of ICs in the storage device 10 according to Embodiment 1 described above with reference to a flowchart in FIG. 3.

Figure 3:
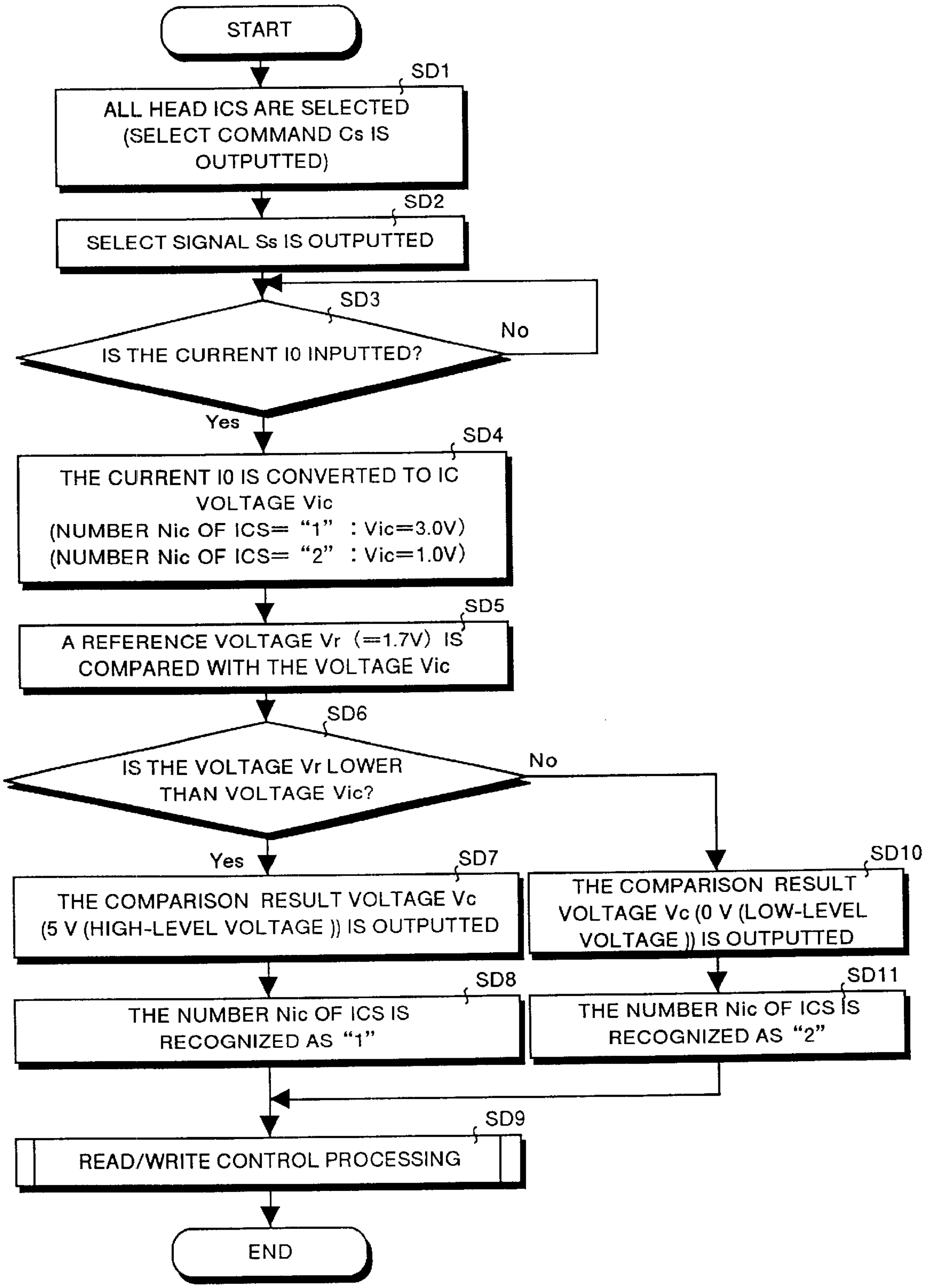
FIG. 3 is a flow chart showing operations for recognizing the number of head ICs in the storage device according to Embodiment 1.

In FIG. 2, when a power is supplied to each section of the device, the HDC circuit 121C shifts the processing to step SD1 shown in FIG. 3, and outputs a select command Cs for selecting all of the head ICs to the control circuit 125C. In this case, all of the head ICs means the head ICs $\mathbf{117}_1$ and IC $\mathbf{117}_2$.

In step SD2, the control circuit 125C outputs a select signal Ss for selecting both the head ICs $\mathbf{117}_1$ and $\mathbf{117}_2$ via the connector 140 and FPC 116. In step SD3, the current/voltage converting circuit 132 determines whether the synthesized current I0 has been inputted or not.

When the select signal Ss is inputted into each of the head IC $\mathbf{117}_1$ and $\mathbf{117}_2$ a first IC current I1 and a second IC current I2 are outputted from the head IC $\mathbf{117}_1$ and head IC $\mathbf{117}_2$ respectively. The first IC current I1 and the second IC current I2 are inputted as a synthesized current I0 via the FPC 116 and connector 140 into the current/voltage converting circuit 132.

The current/voltage converting circuit 132 shifts the processing from step SD3 to step SD4, converts the inputted synthesized current I0 (=first IC current I1+second IC current I2) to an IC voltage Vic (=1.0 V), and outputs the synthesized voltage to the voltage comparing circuit 134. In step SD5, the voltage comparing circuit 134 compares the inputted IC voltage Vic (=1.0 V) with the reference voltage Vr (=1.7 V) inputted from the reference voltage generating circuit 133A, and then shifts the processing to step SD6. In step SD6, the voltage comparing circuit 134 determines whether the reference voltage Vr is lower than the IC voltage Vic or not, and in this case, as the reference voltage Vr is higher than the IC voltage Vic, the voltage comparing circuit 134 recognizes a result of determination in step SD6 as "No" and shifts the processing to step SD10.

In step SD10, the voltage comparing circuit 134 outputs a comparison result voltage Vc of 0 V (low-level voltage) indicating a result of comparison to the control circuit 125C. In step SD11, the HDC circuit 121C recognizes that the number Nic of head ICs electrically connected to the FPC 116 is two, and then shifts the processing to step SD9. In step SD9, the HDC circuit 121C executes the read/write control processing as described in FIG. 10.

Description is made for a case where, in the storage device shown in FIG. 2, the number Nic of head ICs is one, namely a case where only one head IC $117_1$ is electrically connected to the FPC 116. When a power is supplied to each section of the storage device 10, in step SD1 shown in FIG. 3, the HDC 121C outputs a select command Cs for selecting all head ICs to the control circuit 125C. In this case, all head ICs mean the head IC $117_1$.

In step SD2, the control circuit 125C outputs a select signal Ss for selecting all head ICs via the connector 140 and FPC 116 to the head IC $117_1$.

When the select signal Ss is inputted into the head IC $117_1$, a first IC current I1 is outputted from a terminal of the head IC $117_1$. The first IC current I1 is inputted as a synthesized current I0 via the FPC 116 and connector 140 into the current/voltage converting circuit 132. The current/voltage converting circuit 132 shifts the processing from step SD3 to step SD4, converts the inputted synthesized current I0 (=first IC current I1) to the IC voltage Vic (=3.0 V), and outputs the IC voltage Vic to the voltage comparing circuit 134.

In step SD5, the voltage comparing circuit 134 compares the inputted IC voltage Vic (=3.0 V) with a reference voltage Vr (=1.7 V) inputted from the reference voltage generating circuit 133A and shifts the processing to step SD6. In step SD6, as the reference voltage Vr is lower than the IC voltage Vic, the voltage comparing circuit 134 recognizes a result of determination in step SD6 as "Yes", and then shifts the processing to step SD7. In step SD7, the voltage comparing circuit 134 outputs a comparison result voltage Vc of 5 V (high-level voltage) indicating a result of comparison to the control circuit 125C. In step SD8, the HDC circuit 121C recognizes that the number Nic of head ICs electrically connected to the FPC 116 is one, and then shifts the processing to step SD9.

As described above, with the storage device 10 according to Embodiment 1 of the present invention, it is not necessary to package the pull-up circuit 131 (Refer to FIG. 8) on the printed circuit board 120 as required in the storage device based on the conventional technology, and the operation for recognizing the number of ICs is executed by making use of the existing current/voltage converting circuit 132, reference voltage generating circuit 133A, and voltage comparing circuit 134, so that the packaging area on the printed circuit board 120 can be reduced in proportion to the packaging area for the pull-up circuit 131, which in turn allows simplifying of configuration, size reduction, and cost reduction.

Figure 4:
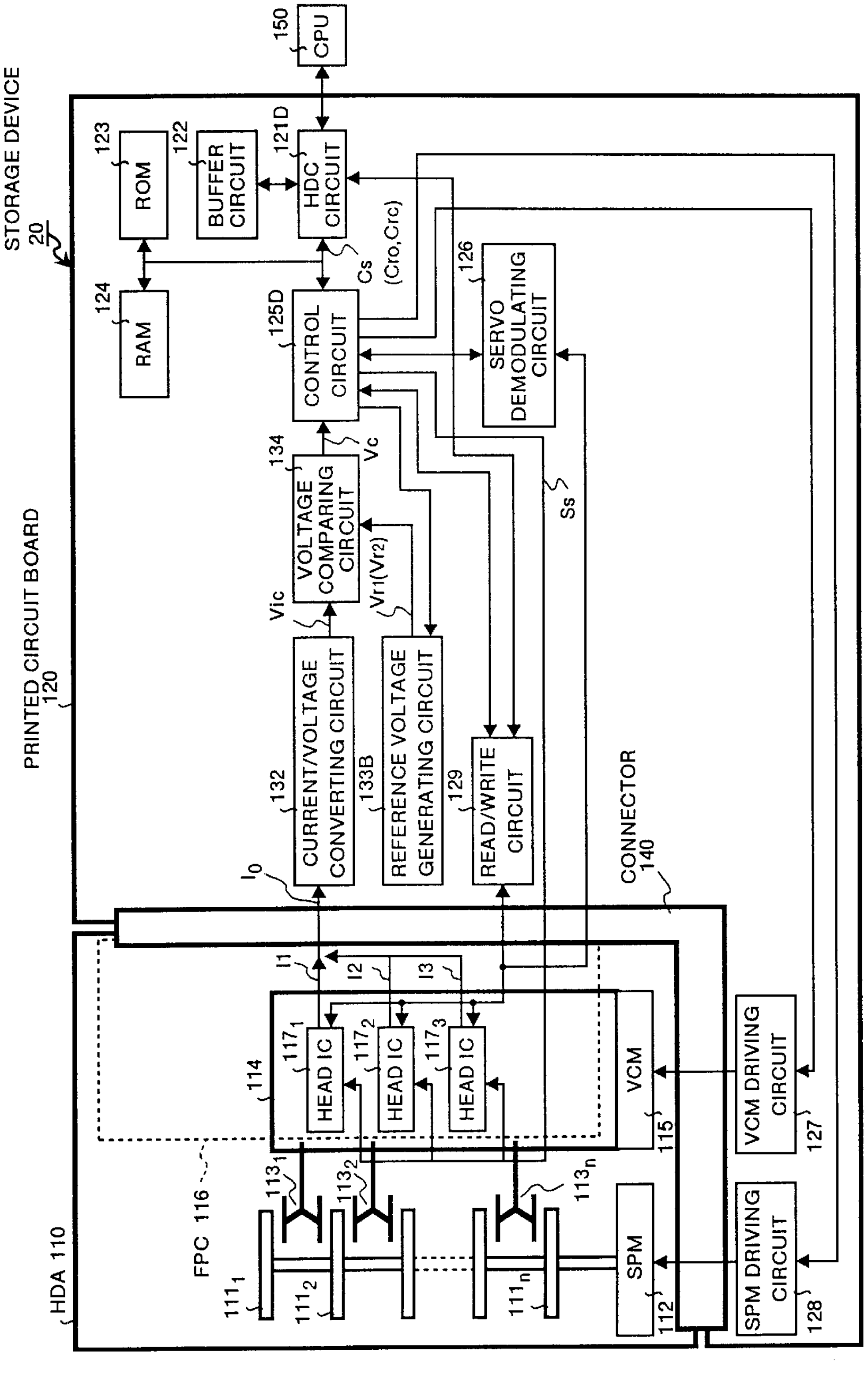
FIG. 4 is a block diagram showing an electrical configuration of the storage device according to Embodiment 2 of the present invention.

FIG. 4 is a block diagram showing electrical configuration of a storage device 20 according to Embodiment 2 of the present invention. In this figure, the same reference numerals are assigned to components corresponding to those in FIG. 2, and description thereof is omitted herein. In FIG. 4, a HDC circuit 121D, a control circuit 125D, and a reference voltage generating circuit 133B are provided in place of the HDC circuit 121C, control circuit 125C and reference voltage generating circuit 133A, and a third head IC $117_3$ is newly provided in addition to the head ICs $117_1$ and $117_2$ shown in FIG. 2.

The HDC circuit 121D and control circuit 125D shown in FIG. 4 have the same functions for read/write control processing described with reference to FIG. 10 as those of the HDC circuit 121A and control 125A shown in FIG. 8, but the operations for recognizing the number of ICs are different from those in the HDC circuit 121C and control circuit 125C shown in FIG. 2.

Detailed description for the operations for recognizing the number of ICs in the HDC circuit 121D and control circuit 125D are made later, and the HDC circuit 121D and control circuit 125D are common to the storage device 10 according to Embodiment 1 described above in the sense that the existing current/voltage converting circuit 132 and voltage comparing circuit 134 are used, but the HDC circuit 121D and control circuit 125D can recognize the number of ICs from one to three.

The reference voltage generating circuit 133B generates two types of reference voltages of a first reference voltage Vr1 (=3.0 V) and a second reference voltage Vr2 (=1.0 V) each as a reference voltage Vr. Herein the first reference voltage Vr1 is used as a threshold value for determining whether the number Nic of ICs is one or two or more.

On the other hand, the second reference voltage Vr2 is used as a threshold value for determination as to whether the number Nic of ICs is two or three after it is determined by using the first reference voltage Vr1 that the number of Nic of ICs is two or more. The reference voltage Vr (the first reference voltage Vr1 or the second reference voltage Vr2) generated by the reference voltage generating circuit 133B is set by the control circuit 125D according to a reference voltage initial set command Cro or a reference voltage change command Crc from the HDC circuit 121D.

The head IC $117_3$ has the same functions as those of the head ICs $117_1$ and $117_2$, and is packaged in parallel to the heads $117_1$ and head $117_2$ on a surface of the FPC 116. This head IC $117_3$ outputs a third IC current I3 as described above when the select signal Ss is inputted.

Operations for recognizing the number of ICs in the storage device 20 according to Embodiment 2 will be described with reference to the flowcharts shown in FIG. 5A and FIG. 5B. In FIG. 4, when a power is supplied to each section of the device, the HDC circuit 121D shifts the processing to step SE1 shown in FIG. 5A, and outputs a reference voltage initial set command Cro for setting the first reference voltage Vr1 (=3.0 V) as a reference voltage Vr in the reference voltage generating circuit 133B to the control circuit 125D. In step SE2, the control circuit 125D sets the first reference voltage Vr1 as the reference voltage Vr in the reference voltage generating circuit 133B.

In step SE3, the HDC circuit 121D outputs a select command Cs for selecting all of the head ICs to the control circuit 125D. In this case, all of head ICs means the three head ICs $117_1$, $117_2$, and $117_3$.

In step SE4, the control circuit 125D outputs the select signal Ss for selecting all of head ICs to via the connector 140 and FPC 116 to all of the head ICs $117_1$, $117_2$, and $117_3$. Further, in step SE5, the current/voltage converting circuit 132 determines whether the synthesized current I0 has been inputted or not.

When the select signal Ss is inputted into the heads IC $117_1$, $117_2$, and head IC $117_3$, a first IC current I1, a second IC current I2, and a third IC current I3 are outputted from terminals of the head ICs $117_1$, $117_2$, and $117_3$ respectively. These first IC current I1, second IC current I2, and third IC current I3 are summed up to get the synthesized current I0 that is inputted via the FPC 116 and connector 140 into the current/voltage converting circuit 132.

The current/voltage converting circuit 132 shifts the processing from step SE5 to step SE6, converts the inputted synthesized current I0 (=first IC current I1+second IC current I1+third IC current I3) to the IC voltage Vic (=0.5 V), and outputs the IC voltage Vic to the voltage comparing circuit 134.

In step SE7, the voltage comparing circuit 134 compares the inputted IC voltage Vic (=0.5 V) with the first reference voltage Vr1 (=3.0 V) inputted from the reference voltage generating circuit 133B, and then shifts the processing to step SE8. In step SE8, the voltage comparing circuit 134 determines whether the first reference voltage Vr1 (3.0 V) is lower than the IC voltage Vic or not. Since the first reference voltage Vr1 is higher than the IC voltage Vic the voltage comparing circuit 134 recognizes a result of determination as "No" and shifts the processing to step SE12.

In step SE12, the voltage comparing circuit 134 outputs a comparison result voltage Vc of 0 V (low-level voltage) indicating a result of comparison to the control circuit 125D. In step SE13, the HDC circuit 121D recognizes that the number Nic of head ICs electrically connected to the FPC 116 is two or more, and shifts the processing to step SE14. In step SE14, the HDC circuit 121D outputs a reference voltage change command Crc for changing the reference voltage Vr from the first reference voltage Vr1 (=3.0 V) to the second reference voltage Vr2 (=1.0 V) to the control circuit 125D. Thus, in step SE15, the control circuit 125D changes the reference voltage Vr in the reference voltage generating circuit 133B to the second reference voltage Vr2 (=1.0 V), and the reference voltage Vr inputted into the voltage comparing circuit 134 is changed from the first reference voltage Vr1 (=3.0 V) to the second reference voltage Vr2 (=1.0 V).

In step SE16, the voltage comparing circuit 134 compares the second reference voltage Vr2 (=1.0 V) to the IC voltage Vic (=0.5 V), and shifts the processing to step SE17. In step SE17, the voltage comparing circuit 134 determines whether the second reference voltage Vr2 (=1.0 V) is lower than the IC voltage Vic (=0.5 V) or not. Since the second reference voltage Vr2 is higher than the IC voltage Vic, the voltage comparing circuit 134 recognizes a result of determination as "No", and shifts the processing to step SE20.

In step SE20, the voltage comparing circuit 134 outputs a comparison result voltage Vc of 0 V (low-level voltage) as a result of comparison to the control circuit 125D. In step SE21, the HDC circuit 121D recognizes that the number Nic of head ICs electrically connected to the FPC 116 is three, shifts the processing to step SE11 and executes the read/write control processing like that described with reference to FIG. 10.

Operations for recognizing the number of ICs when the number Nic of head ICs is two in the storage device 20 shown in FIG. 4 will be described. In this description, it is assumed that the two head ICs $117_1$ and $117_2$ are electrically connected to the FPC 116 while the head IC $117_3$ is not electrically connected thereto.

Figure 5A:
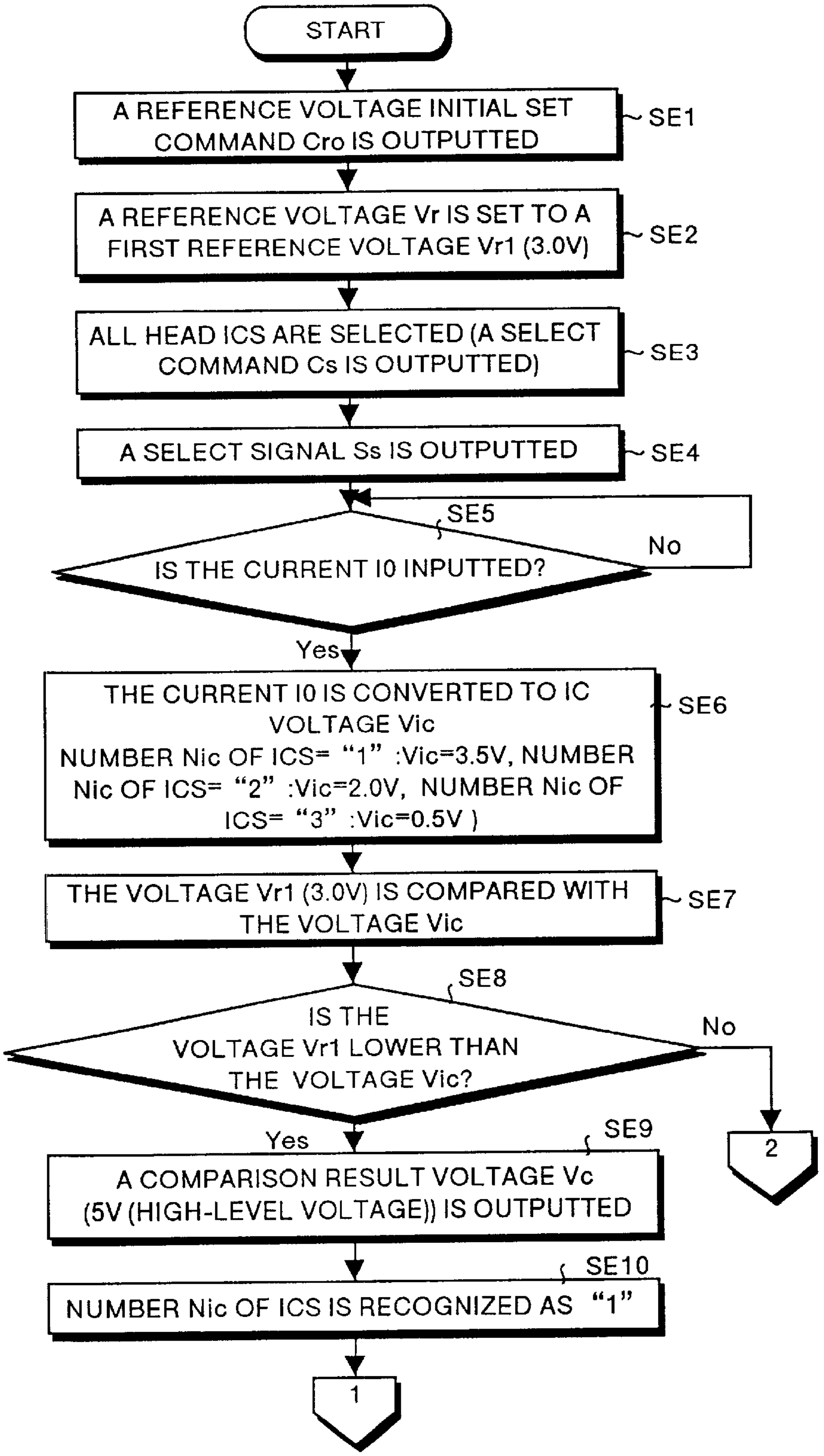
FIG. 5A and FIG. 5B are flow charts showing operations for recognizing the number of head ICs in the storage device according to Embodiment 2.
Figure 5B:
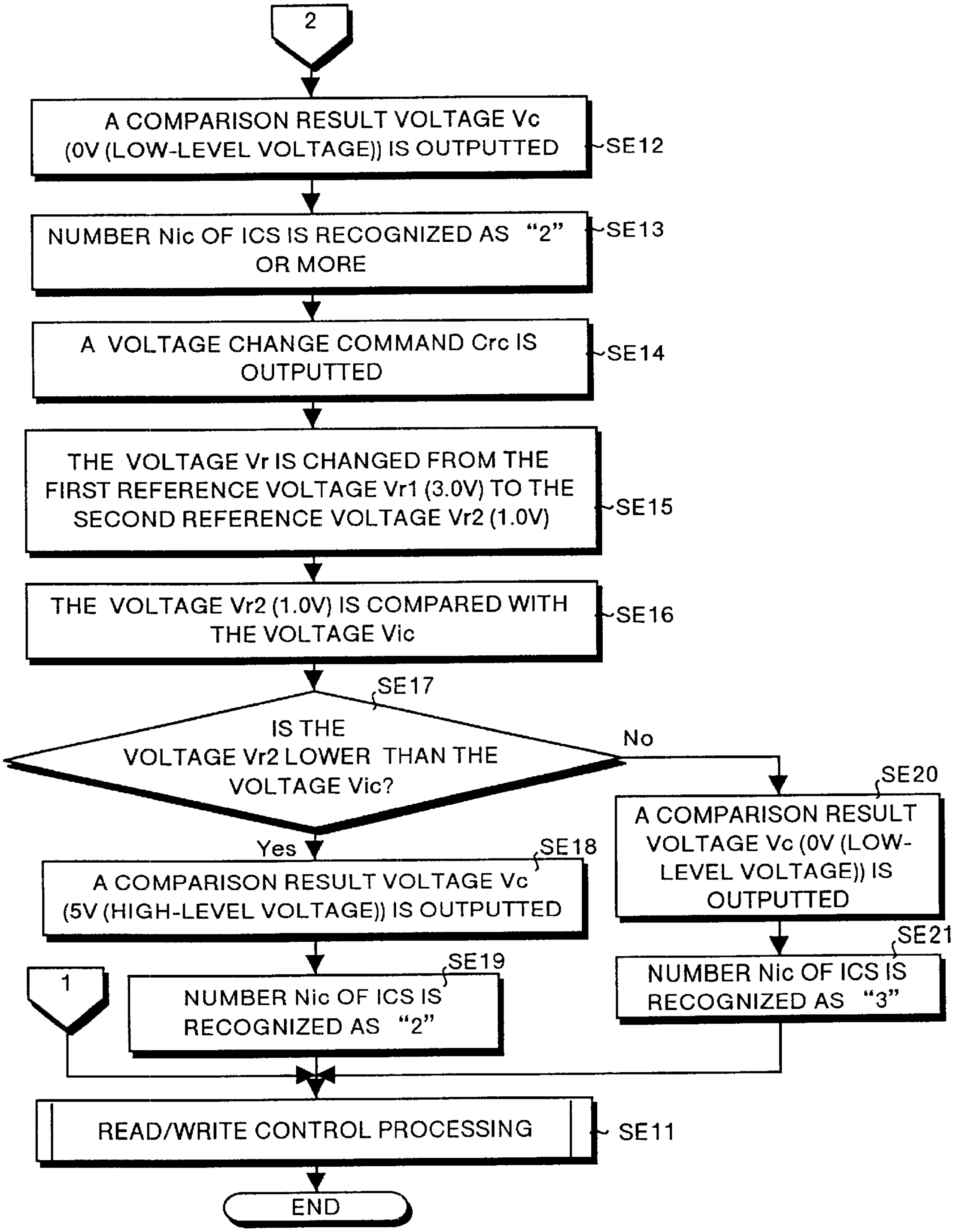

With the configuration as described above, when a power is supplied to each section of the device, the steps from SE1 to step SE3 shown in FIG. 5A are executed, and then in step SE4, the control circuit 125D outputs a select signal Ss for selecting all head ICs to both the head ICs $117_1$ and $117_2$ via the connector 140 and FPC 116.

Therefore, a first IC current I1 and a second IC current I2 are outputted from terminals of the head ICs $117_1$ and $117_2$, and the first IC current I1 and second IC current I2 are summed to get a synthesized current I0 that is inputted into the current/voltage converting circuit 132 via the FPC 116 and connector 140. The current/voltage converting circuit 132 shifts the processing from step SE5 to step SE6, converts the inputted synthesized current I0 (=first IC current I1+second IC current I2) to the IC voltage Vic (=2.0 V), and outputs the IC voltage Vic to the voltage comparing circuit 134.

In step SE7, the voltage comparing circuit 134 compares the inputted IC voltage Vic (=2.0 V) with the first reference voltage Vr1 (=3.0 V) inputted from the reference voltage generating circuit 133B as described above, and then shifts the processing to step SE8. In step SE8, since the first reference voltage Vr1 is higher than the IC voltage Vic, the voltage comparing circuit 134 recognizes a result of determination as "No", and shifts the processing to step SE12.

Then the steps from step SE12 to step SE15 are executed, and in step SE16, the voltage comparing circuit 134 compares the second reference voltage Vr2 (=1.0 V) with the IC voltage Vic (=2.0 V), and then shifts the processing to step SE17. In step SE17, since the second reference voltage Vr2 (=1.0 V) is lower than the IC voltage Vic (=2.0 V), the voltage comparing circuit 134 recognizes a result of determination in step SE17 as "Yes" and then shifts the processing to step SE18.

In step SE18, the voltage comparing circuit 134 outputs a comparison result voltage Vc of 5 V (high-level voltage) indicating a result of comparison to the control circuit 125D. In step SE19, the HDC circuit 121D recognizes that the number Nic of head ICs electrically connected to the FPC 116 is two, and then shifts the processing to step SE11.

In the following, operations for recognizing the number of ICs in a case where the number Nic of ICs is one are described. It is assumed that only one head IC $117_1$ is electrically connected to the FPC 116 shown in FIG. 4.

With the configuration as described above, when a power is supplied to each section of the device, the steps from step SE1 to step SE3 shown in FIG. 5A are executed, and in step SE4, the control circuit 125D outputs a select signal Ss for selecting all head ICs to the head IC $117_1$.

A first IC current I1 is outputted from a terminal of the head IC $117_1$, and the first IC current I1 is inputted as a synthesized current I0 via the FPC 116 and connector 140 into the current/voltage converting circuit 132. Then, the current/voltage converting circuit 132 shifts the processing from step SE5 to step SE6, converts the inputted synthesized current I0 (=first IC current I1) to the IC voltage Vic (=3.5 V), and outputs the IC voltage Vic to the voltage comparing circuit 134.

In step SE7, the voltage comparing circuit 134 compares the inputted IC voltage Vic (=3.5 V) with the first reference voltage Vr1 (=3.0 V) inputted from the reference voltage generating circuit 133B, and then shifts the processing to step SE8. In step SE8, since the first reference voltage Vr1 is lower than the IC voltage Vic, the voltage comparing circuit 134 recognizes a result of determination as "Yes" and then shifts the processing to step SE9.

In step SE9, the voltage comparing circuit 134 outputs a comparison result voltage Vc of 5 V (high-level voltage) indicating a result of comparison to the control circuit 125D. In step SE10, the HDC circuit 121D recognizes that the number Nic of head ICs electrically connected to the FPC 116 is one, and shifts the processing to step SE11.

As described above, with the storage device 20 according to Embodiment 2 of the present invention described above, the pull-up circuit 131 and pull-down circuit 135 used in the storage device 200 based on the conventional technology (Refer to FIG. 11) are not required to be packaged on the printed circuit board, and operations for recognizing the number of ICs from one to three are executed by making use of the existing current/voltage converting circuit 132 and voltage comparing circuit 134, so that the packaging area of the printed circuit board 120 equivalent to the packaging areas for the pull-up circuit 131 and pull-down circuit 135 can further be reduced, which in turn allows simplification in configuration, size and cost reduction.

Figure 6:
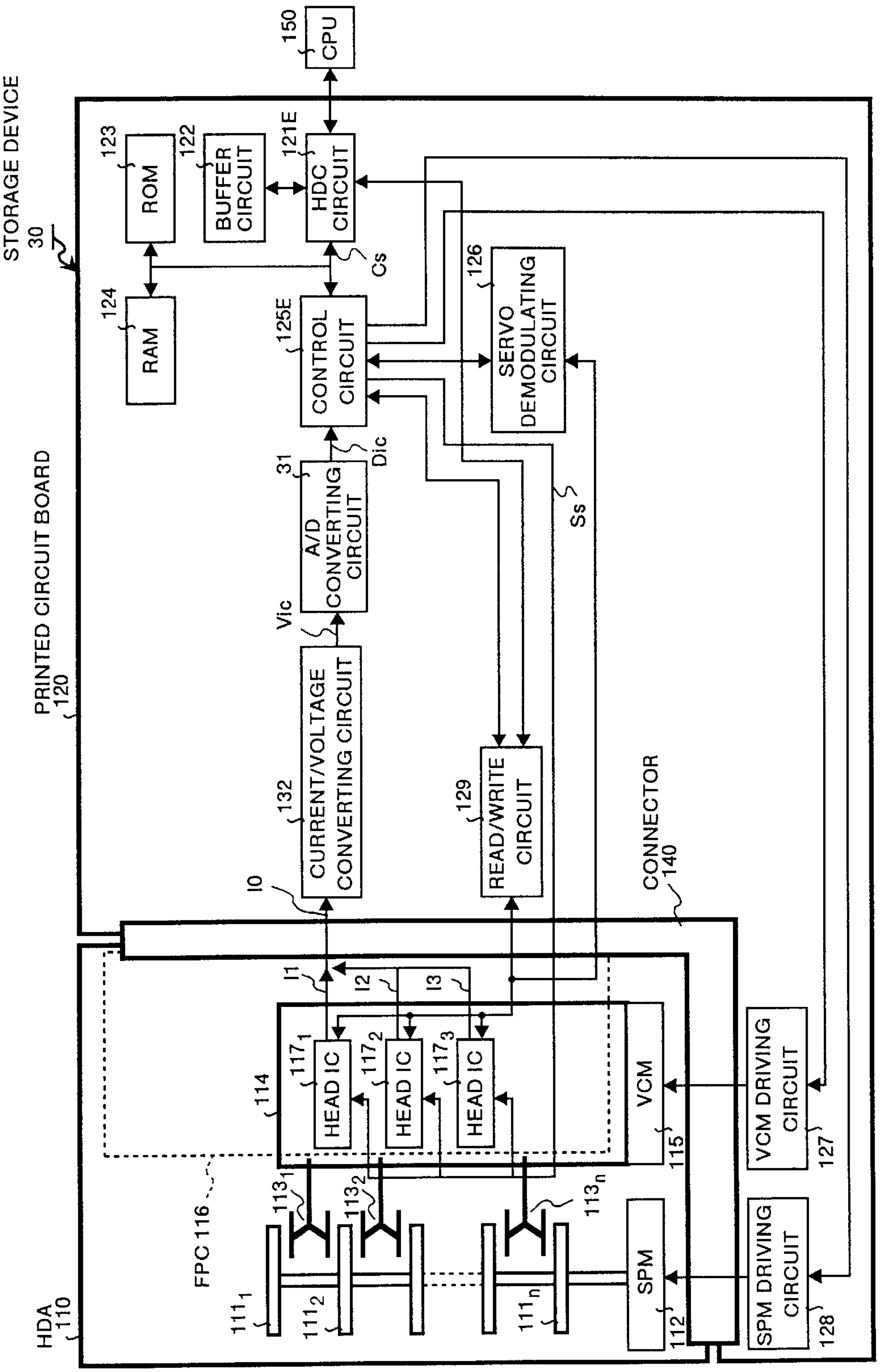
FIG. 6 is a block diagram showing electrical configuration of a storage device according to Embodiment 3 of the present invention.

FIG. 6 is a block diagram showing electric configuration of a storage device according to Embodiment 3 of the present invention. In this figure, the same reference numerals are assigned to the sections corresponding to those in FIG. 4, and description thereof is omitted herein. In FIG. 6, an HDC circuit 121E, a control circuit 125E and an A/D (analog/digital) converting circuit 31 are provided in place of the HDC circuit 121D, control circuit 125D, and voltage comparing circuit 134 shown in FIG. 4. Further, in FIG. 6, the reference voltage generating circuit 133B shown in FIG. 4 is not provided.

The HDC circuit 121E and control circuit 125E has the same functions for read/write control processing as described with reference to FIG. 10, but the operations for recognizing the number of ICs are slightly different from those in the HDC circuit 121D and control circuit 125D shown in FIG. 4.

Operations for recognizing the number of ICs in the HDC circuit 121E and control circuit 125E are described later in detail, but the HDC circuit 121E and control circuit 125E can recognize the number Nic of ICs from one to three.

The A/D converting circuit 31 converts an IC voltage Vic inputted from the current/voltage converting circuit 132 to, for instance, 4-bit digital data Dic. For instance, the A/D converting circuit 31 converts an IC voltage Vic (=3.5 V) to digital data Dic (="0111") when the number Nic is one, namely in a case when only one head IC 117$_1$ is electrically connected to the FPC 116.

Also when the number Nic is two, namely when two head ICs 117$_1$ and 117$_2$ are electrically connected, the A/D converting circuit 31 converts the IC voltage Vic (=2.0 V) to digital data Dic (="0100"). Further, when the number Nic of ICs is three, namely when three head ICs 117$_1$ to 117$_3$ are electrically connected to the FPC 116, the A/D converting circuit 31 converts the IC voltage Vic (=0.5 V) to digital data Dic (="0001").

Operations for recognizing the number of ICs in the storage device according to Embodiment 3 of the present invention will be described with reference to the flow chart shown in FIG. 7. At first, a case where the number Nic of ICs is three, namely for a case where three head ICs 117$_1$ to 117$_3$ are connected to the FPC 116.

Figure 7:
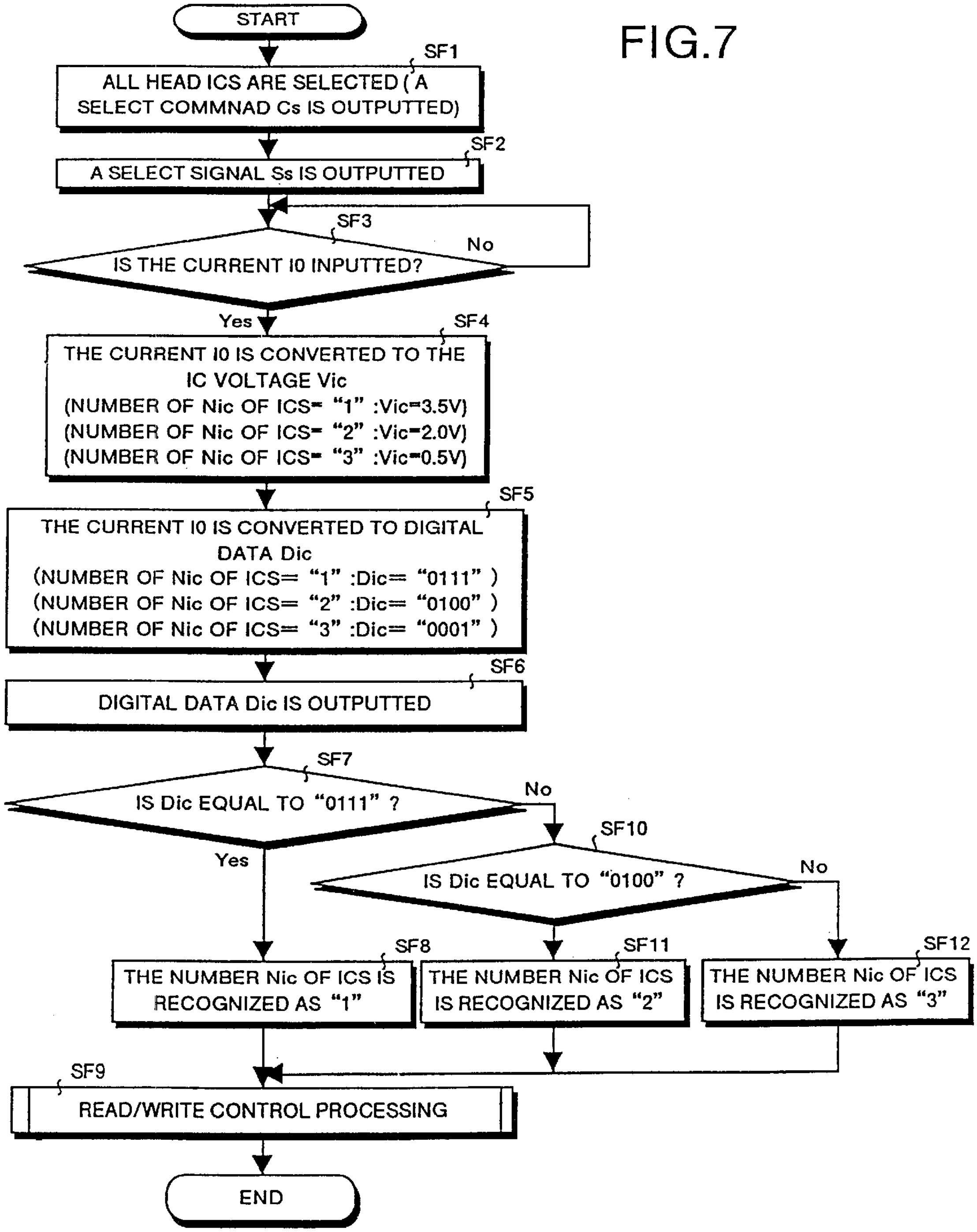
FIG. 7 is a flow chart showing operations for recognizing the number of head ICs in the storage device according to Embodiment 3.

In FIG. 6, when a power is supplied to each section of the device, the HDC circuit 121E shifts the processing to step SF1 shown in FIG. 7, and outputs a select command Cs for selecting all head ICs to the control circuit 125E. In this case, all head ICs means all the three head ICs 117$_1$, 117$_2$, and 117$_3$.

In step SF2, the control circuit 125E outputs a select signal Ss for selecting all of the head ICs to all of the head ICs 117$_1$ to 117$_3$ via the connector 140 and FPC 116. Further, in step SF3, the current/voltage converting circuit 132 determines whether the synthesized current I0 has been inputted or not.

When the select signal Ss is inputted into each of the head ICs 117$_1$ to 117$_3$, a first IC current I1, a second IC current I2 and a third IC current I3 are outputted from the head ICs 117$_1$, 117$_2$, and 117$_3$ respectively. The IC current I1, second IC current I2, and IC current I3 are summed to get a synthesized current I1 that is inputted into the current/voltage converting circuit 132.

The current/voltage converting circuit 132 shifts the processing from step SF3 to step SF4, converts the inputted synthesized current I0 (=first IC current+second IC current+third IC current) to an IC voltage Vic (=0.5 V), and outputs the IC voltage Vic to the A/D converting circuit 31.

Then in step SF5, the A/D converting circuit 31 converts the inputted IC voltage Vic (=0.5 V) to the corresponding digital data Dic of "0001". In step SF5, the A/D converting circuit 31 outputs the digital data Dic ("0001") to the control circuit 125E and shifts the processing to step SF7.

In step SF7, the HDC circuit 121E determines whether the inputted digital data Dic is "10111" corresponding to the IC number Nic of one or not. In this case, as the inputted digital data Dic is "0001", the HDC circuit 121E recognize a result of determination in step SF7 as "No", and shifts the processing to step SF10.

In step SF10, the HDC circuit 121E determines like in step SF7 whether the inputted digital data Dic is "0100" corresponding to the number Nic of two or not. In this case, as the inputted digital data Dic is "0001", the HDC circuit 121E recognizes a result of determination in step SF10 as "No", and then shifts the processing to step SF12. In step SF12, the HDC circuit 121E recognizes that the number Nic of ICs is three, shifts the processing to step SF9 and executes the read/write control processing similar to that described with reference to FIG. 10.

Operations for recognizing the number of ICs in the storage device shown in FIG. 6 when the number Nic of ICs is two will be described. In the following description, it is assumed that the two head ICs 117$_1$ and 117$_2$ are electrically connected to the FPC 116 shown in FIG. 6 and that the head IC 117$_3$ is not connected therein.

With the configuration as described above, when a power is supplied to each section of the device, in step SF1 shown in FIG. 7, a select command Cs is outputted from the HDC circuit 121E to the control circuit 125E. In step SF2, a select signal Ss is outputted from the control circuit 125E to the head ICs 117$_1$ and 117$_2$. A first IC current I1 and a second IC current I2 are outputted from the terminals of the head ICs 117$_1$ and 117$_2$ respectively. The first IC current I1 and second IC current I2 are summed to get a synthesized current I0 that is inputted into the current/voltage converting circuit 132.

The current/voltage converting circuit 132 shifts the processing from step SF3 to step SF4, converts the inputted synthesized current I0 (=first IC current I1+second IC current I2) to an IC voltage Vic (=2.0 V), and outputs the IC voltage Vic to the A/D converting circuit 31.

In step SF5, the A/D converting circuit 31 converts the inputted IC voltage Vic (=2.0 V) to the corresponding digital data Dic of "0100", in step SF6 outputs the digital data Dic (="0100") to the control circuit 125E and then shifts the processing to step SF7.

In step SF7, as the inputted digital data Dic is "0100", the HDC circuit 121E recognizes a result of determination as "No", and shifts the processing to step SF10. In step SF10, as the inputted digital data Dic is "0100", the HDC circuit 121E recognizes a result of determination as "Yes", and shifts the processing to step SF11. In step SF11, the HDC circuit 121E recognizes the number Nic of ICs as two, and then shifts the processing to step SF9.

Next description is made for the operations for recognizing the number of ICs, when the number Nic of ICs is one, in the storage device 30 shown in FIG. 6. In the following description, it is assumed that only one head IC $117_1$ is electrically connected to the FPC 116 shown in FIG. 6.

With the configuration as described above, when a power is supplied to each section of the device, after the operation in step SF1 described above is executed, in step SF2 a select signal Ss is outputted from the control circuit 125E to the head IC $117_1$. A first IC current I1 is outputted from a terminal of the head IC $117_1$ as a synthesized current I0 to the current/voltage converting circuit 132.

The current/voltage converting circuit 132 shifts the processing from step SF3 to step SF4, converts the inputted synthesized I0 (=first IC current I1) to the IC voltage Vic (=3.5 V), and outputs the IC voltage to the A/D converting circuit 31. Instep SF5, the A/D converting circuit 31 converts the inputted IC voltage Vic (=3.5 V) to the corresponding digital data Dic of "0111", in step SF6 outputs the digital data Dic (="0111") to the control circuit 125E and then shifts the processing to step SF7.

In step SF7, as the inputted digital data Dic is "0111", the HDC circuit 121E recognizes a result of determination as "Yes" and then shifts the processing to step SF8. Then, in step SF8, the HDC circuit 121E recognizes that the number Nic of ICs is one and shifts the processing to step SF9.

Figure 11:
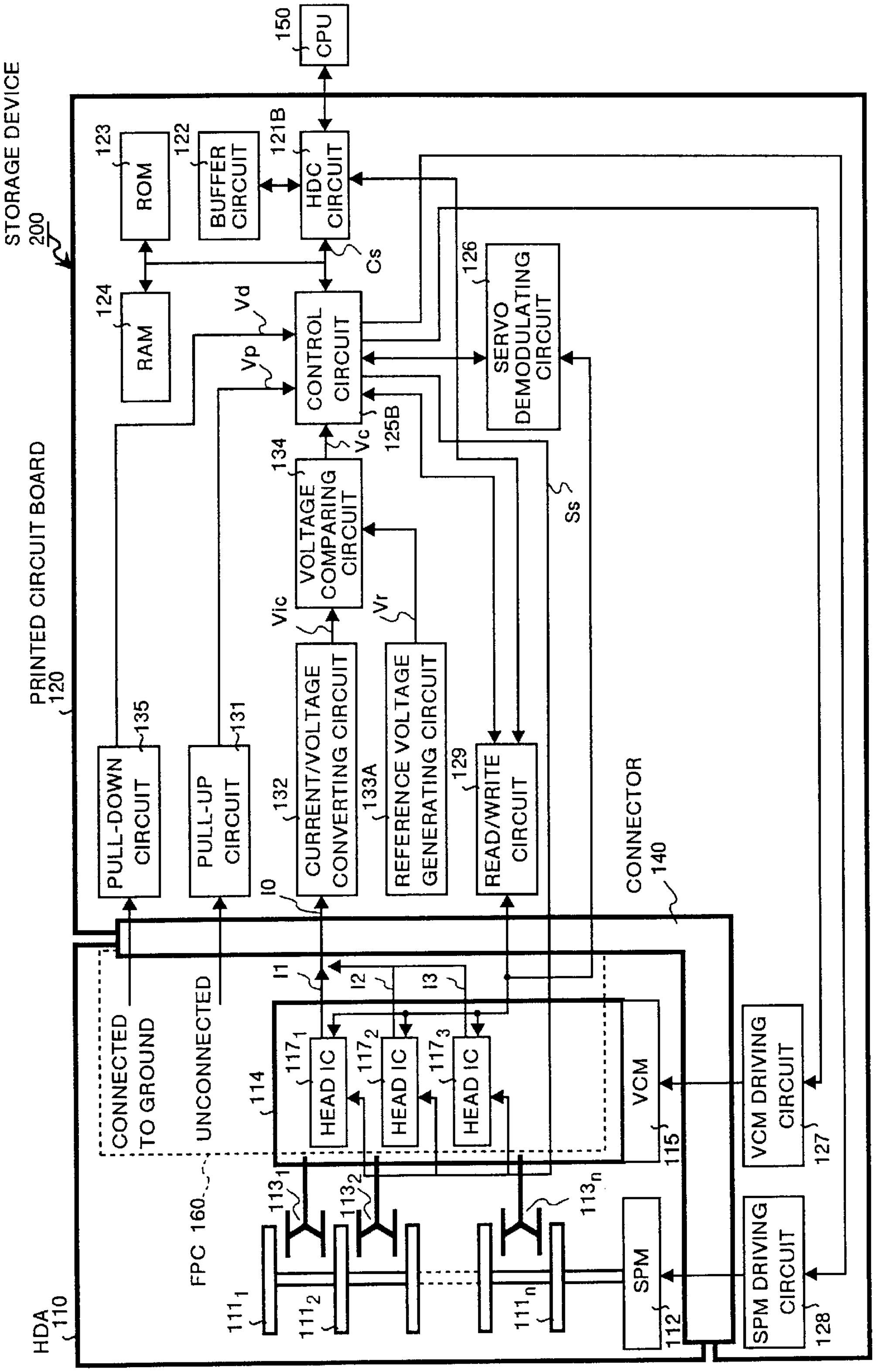
FIG. 11 is a block diagram showing electrical configuration of the storage device based on the conventional technology.
Figure 12:
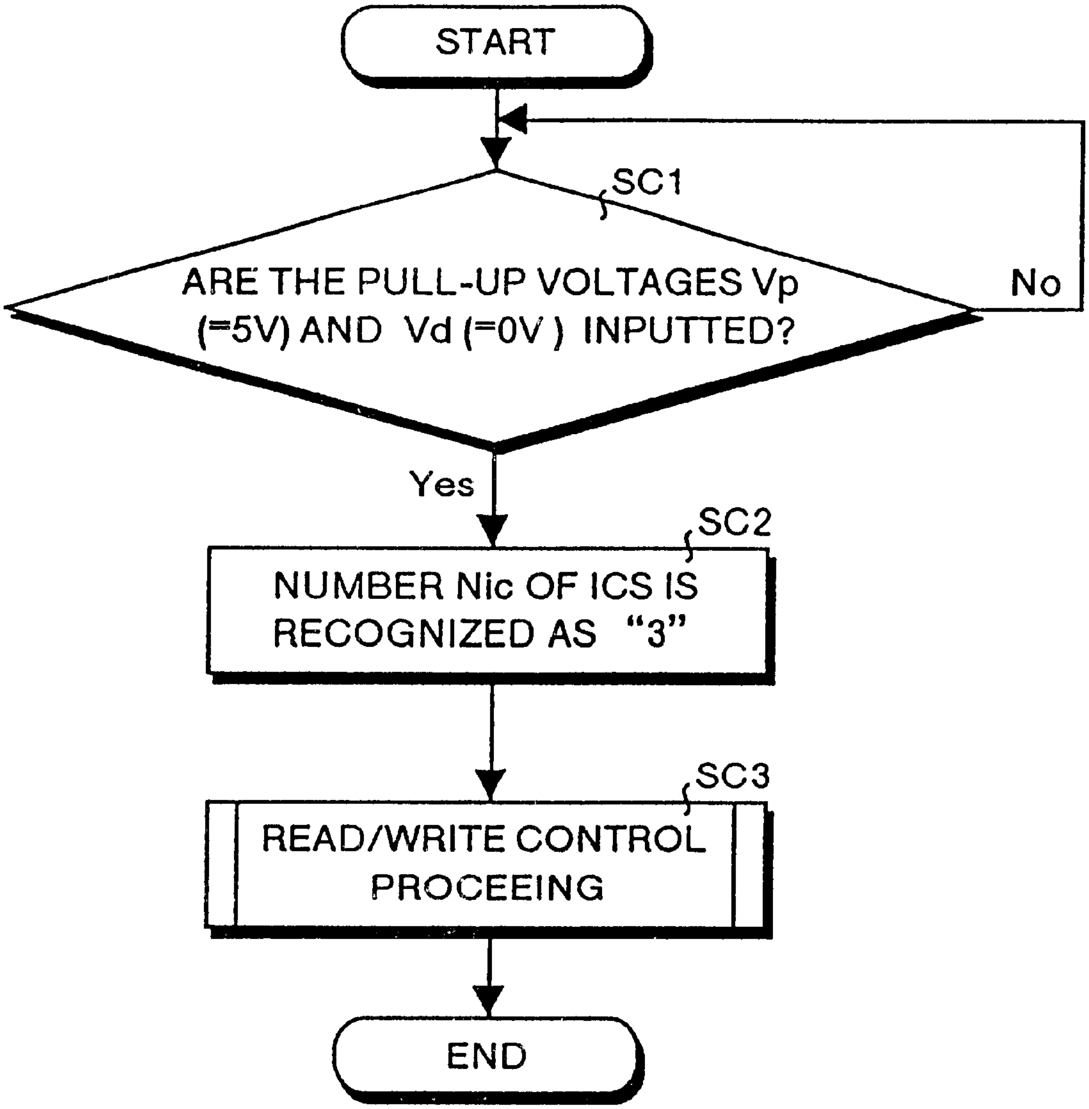
FIG. 12 is a flow chart showing operations for recognizing the number of head ICs in the above storage device based on the conventional technology.

As described above, with the storage device 30 according to Embodiment 3 of the present invention, the A/D converting circuit 31 is provided, and the number Nic of ICs is recognized according to digital data Dic, so that the number Nic of ICs from one to three can be recognized without packaging therein the reference voltage generating circuit 133A in addition to the pull-up circuit 131 and pull-down circuit 135 as used in the storage device 200 based on the conventional technology (Refer to FIG. 11).

Accordingly, with the storage device 30 according to Embodiment 3 of the present invention described above, the packaging area can be reduced not only by those required for the pull-up circuit 131 and pull-down circuit 135, but also by that required for the reference voltage generating circuit 133A, so that it is possible to further simplify the configuration and to reduce the size and the cost.

Detailed description is made above for the storage devices 10, 20, and 30 according to Embodiments 1, 2, and 3 of the present invention respectively, but the invention is not limited to the Embodiments 1, 2 and 3, and various changes and modification in design thereof can be made within a gist of the present invention.

For instance, in the storage devices 10 and 20 according to the Embodiments 1 and 2 respectively, a synthesized current I0 is converted to an IC voltage Vic, and the number Nic of ICs is recognized according to the IC voltage Vic. However, the number Nic of ICs may be recognized according to, for instance, a result of comparison of the synthesized current I0 to a threshold value. In brief, any type of configuration in which the number Nic of ICs is recognized according to the synthesized current I0 are included within the scope of the present invention.

In the storage device 20 according to Embodiment 2 of the present invention described above, the reference voltage Vr is changed in two stages from the first reference voltage Vr1 to the second reference voltage Vr2 so that the number Nic of ICs from one to three can be recognized. However, this is only an example, and the configuration is allowable in which the number Nic of ICs of four or more can be recognized by changing the reference voltage Vr in three stages or more.

Further in the storage device 30 according to Embodiment 3 of the present invention described above, the number of ICs from one to three are recognized. However, the configuration is not limited to this one, and a step for determination similar to that in step SF7 and step SF10 may be added so that the number Nic of ICs of four or more can be recognized.

In addition, in the storage devices 10, 20, and 30 according to Embodiments 1, 2, and 3 of the present invention, the HDA 110 may be considered as a storage device and the components other than the HDA 110 may be considered as a control device.

As described above, with the present invention, the number of head ICs is confirmed according to the synthesized current obtained by synthesizing the IC currents outputted from head ICs, so that a circuit dedicated for confirming the number of head ICs as required in the conventional technology is not necessary, and a packaging area equivalent to the packaging area of such a dedicated circuit can be reduced, and also the number of components can be reduced. Therefore, there is provided the advantage that simplification in configuration, size reduction, and cost reduction becomes possible.

With the present invention, whether the number of ICs is one or plural is confirmed according to the result of comparison by a comparing unit, so that a circuit dedicated for confirming the number of head ICs as required in the conventional technology is not necessary, and a packaging area equivalent to the packaging area of such a dedicated circuit can be reduced, and also the number of components can be reduced. Therefore, there is provided the advantage that simplification in configuration, size reduction, and cost reduction becomes possible.

With the present invention, the number of ICs is confirmed according to a synthesized current obtained by synthesizing IC currents outputted from head ICs, so that a circuit dedicated for confirming the number of head ICs as required in the conventional technology is not necessary, and a packaging area equivalent to the packaging area of such a dedicated circuit can be reduced, and also the number of components can be reduced.

Therefore, there is provided the advantage that simplification in configuration, size reduction, and cost reduction becomes possible.

With the present invention, whether the number of head ICs is one or plural is checked according to a result of comparison by a comparing unit, so that a circuit dedicated for confirming the number of head ICs as required in the conventional technology is not necessary, and a packaging area equivalent to the packaging area of such a dedicated circuit can be reduced, and also the number of components can be reduced. Therefore, there is provided the advantage that simplification in configuration, size reduction, and cost reduction becomes possible.

With the present invention, the number of head ICs is recognized according to the synthesized current obtained by synthesizing the IC currents outputted from head ICs, so that a circuit dedicated for confirming the number of head ICs as required in the conventional technology is not necessary, and a packaging area equivalent to the packaging area of such a dedicated circuit can be reduced, and also the number of components can be reduced. Therefore, there is provided the advantage that simplification in configuration, size reduction, and cost reduction becomes possible.

With the present invention, whether the number of ICs is one or plural is confirmed according to a result of comparison in a comparing step, so that a circuit dedicated for confirming the number of head ICs as required in the conventional technology is not necessary, and a packaging area equivalent to the packaging area of such a dedicated circuit can be reduced, and also the number of components can be reduced. Therefore, there is provided the advantage that simplification in configuration, size reduction, and cost reduction becomes possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage device comprising:

a plurality of heads each for writing data in or reading data from a storage medium;

at least one head IC for controlling said heads and for outputting IC current;

a selecting unit for selecting all of said head ICs;

a number confirming unit for synthesizing the IC currents outputted from said head ICs selected by said selecting unit, and for confirming a number of mounted head ICs based on the obtained synthesized current.

2. The storage device according to claim 1 further comprising:

a current/voltage converting unit for converting the synthesized current to an IC voltage; and a comparing unit for comparing the obtained IC voltage to a preset reference voltage;

wherein said number confirming unit determines that the number of mounted head ICs is one when the comparison by said comparing unit shows that the IC voltage is higher than the reference voltage, and determines that the number of mounted head ICs is plural when the comparison by said comparing unit shows that the IC voltage is not more than the reference voltage.

3. The storage device according to claim 2, further comprising:

a reference voltage generating unit for generating the reference voltage.

4. The control unit for controlling a storage device having a plurality of heads each for writing data in or reading data from a storage medium, at least one head IC for controlling said heads and for outputting an IC current, and a normality checking unit for checking normality of each of said head ICs according to the IC current, said control unit comprising:

a selecting unit for selecting all of said head ICs; and a number confirming unit for synthesizing currents outputted from said head ICs selected by said selecting unit, and for confirming a number of mounted head ICs based on the obtained synthesized current.

5. The control unit for a storage device according to claim 4 further comprising:

a current/voltage converting unit for converting the synthesized current to an IC voltage; and a comparing unit for comparing the obtained IC voltage to a preset reference voltage;

wherein said number confirming unit determines that the number of mounted head ICs is one when the comparison by said comparing unit shows that the IC voltage is higher than the reference voltage, and determines that the number of mounted head ICs is plural when the comparison by said comparing unit shows that the IC voltage is not more than the reference voltage.

6. The storage device according to claim 5, further comprising:

a reference voltage generating unit for generating the reference voltage.

7. A method of controlling a storage device comprising a plurality of heads each for writing data in or reading data from a storage medium, at least one head IC for controlling said heads and for outputting an IC current, and a normality checking unit for checking normality of the head IC or ICs according to the IC currents, said method comprising:

a selecting step of selecting all of said head ICs;

a synthesizing step of synthesizing the IC currents outputted from said head ICs selected in the selecting step; and a number confirming step of confirming the number of mounted head ICs based on the obtained synthesized current.

8. The method of controlling a storage device according to claim 7 further comprising:

a current/voltage converting step of converting the synthesized current to an IC voltage; and a comparing step of comparing the obtained IC voltage to a preset reference voltage;

wherein in the number checking step it is determined that the number of mounted head ICs is one when the comparison in the comparison step shows that the IC current is higher than the reference voltage, and it is also determined that the number of mounted head ICs is plural when the comparison in the comparing step shows that the IC voltage is not more than the reference voltage.

* * * * *